(12) United States Patent
Solon

(10) Patent No.: US 12,015,375 B2
(45) Date of Patent: Jun. 18, 2024

(54) LEAD ASSEMBLY FOR CONNECTING SOLAR PANEL ARRAYS TO INVERTER

(71) Applicant: SHOALS TECHNOLOGIES GROUP, LLC, Portland, TN (US)

(72) Inventor: Dean Solon, Gallatin, TN (US)

(73) Assignee: SHOALS TECHNOLOGIES GROUP, LLC, Portland, TN (US)

(*) Notice: Subject to any disclaimer, the term of this patent is extended or adjusted under 35 U.S.C. 154(b) by 0 days.

(21) Appl. No.: 18/341,655

(22) Filed: Jun. 26, 2023

(65) Prior Publication Data

US 2023/0336118 A1  Oct. 19, 2023

Related U.S. Application Data

(63) Continuation of application No. 17/301,609, filed on Apr. 8, 2021, now Pat. No. 11,689,153, which is a continuation of application No. 14/849,458, filed on Sep. 9, 2015, now Pat. No. 10,992,254.

(60) Provisional application No. 62/047,773, filed on Sep. 9, 2014.

(51) Int. Cl.
*H02S 40/30* (2014.01)
*H01R 4/70* (2006.01)
*H01R 9/03* (2006.01)

(52) U.S. Cl.
CPC ............ *H02S 40/30* (2014.12); *H01R 4/70* (2013.01); *H01R 9/03* (2013.01)

(58) Field of Classification Search
CPC ............ H01L 31/0422; H01L 31/0424; H01L 31/0482; H01L 31/0484; H01L 31/05; H01L 31/02013; H01L 31/02008; H01L 31/02021; E04D 3/40; H02S 40/00–38; H01R 4/187; H01R 4/18; H01R 4/70; H01R 11/11; H01R 4/021; H01R 4/023;
(Continued)

(56) References Cited

U.S. PATENT DOCUMENTS

| 1,831,002 A | 11/1931 | Hickey |
| 2,700,085 A | 1/1955 | Breisch et al. |
| 2,808,487 A | 10/1957 | Jacobs |

(Continued)

FOREIGN PATENT DOCUMENTS

| CN | 2336459 | 9/1999 |
| CN | 2411542 | 12/2000 |

(Continued)

OTHER PUBLICATIONS

Machine translation of JP2014-05227A (Year: 2014).*

(Continued)

*Primary Examiner* — Ryan S Cannon
(74) *Attorney, Agent, or Firm* — MASCHOFF BRENNAN; Paul G. Johnson

(57) ABSTRACT

A lead assembly includes at plurality of drop line joined to a feeder cable at joints each having a compression lug that is preferably surrounded by undermolding and overmolding. In use, each drop line is connected to a solar array, and the feeder cable is connected to an inverter. In this manner a plurality of solar arrays are electrically coupled together, with a common feeder cable connecting them all to the inverter. A system of the present invention doesn't require a combiner box which is conventionally employed directly upstream of the inverter.

24 Claims, 26 Drawing Sheets

(58) Field of Classification Search
CPC .. H01R 4/5205; H01R 13/5205; H01R 4/027; H01R 4/10; H01R 9/0509
USPC .................. 52/173.3; 136/243–265
See application file for complete search history.

(56) References Cited

U.S. PATENT DOCUMENTS

| | | |
|---|---|---|
| 3,085,138 A | 4/1963 | Brown et al. |
| 3,086,242 A | 4/1963 | Cook et al. |
| 3,243,211 A | 3/1966 | Wetmore |
| 3,296,399 A | 1/1967 | Kozacka |
| 3,559,141 A | 1/1971 | Hardy |
| 3,678,432 A | 7/1972 | Boliver |
| 3,686,603 A | 8/1972 | Lockie et al. |
| 3,686,604 A | 8/1972 | Link et al. |
| 3,700,786 A * | 10/1972 | Lawrenson ............ H01B 7/08 |
| | | 174/72 A |
| 3,781,745 A | 12/1973 | Vadnagara |
| 3,795,757 A | 3/1974 | Higgins |
| 3,818,407 A | 6/1974 | Edgerton |
| 3,852,516 A | 12/1974 | Henry et al. |
| 3,946,351 A | 3/1976 | Bronikowski et al. |
| 4,060,785 A | 11/1977 | Hanke et al. |
| 4,251,304 A | 2/1981 | Campbell et al. |
| 4,308,515 A | 12/1981 | Rooney et al. |
| 4,464,583 A * | 8/1984 | Holmgren ............ H01B 9/029 |
| | | 439/736 |
| 4,625,196 A | 11/1986 | Muench et al. |
| 4,778,948 A | 10/1988 | Fitch et al. |
| 4,780,598 A | 10/1988 | Fahey et al. |
| 4,947,149 A | 8/1990 | Pimpis et al. |
| 5,316,502 A | 5/1994 | Loet |
| 5,316,789 A | 5/1994 | Ookuma et al. |
| 5,726,851 A | 3/1998 | Knapp |
| 5,903,209 A | 5/1999 | Stepniak |
| 6,265,665 B1 | 7/2001 | Zahnen |
| 6,268,559 B1 | 7/2001 | Yamawaki |
| 7,422,458 B2 | 5/2008 | Arai |
| 7,387,537 B1 | 6/2008 | Daily |
| 8,207,637 B2 | 6/2012 | Marroquin et al. |
| 8,242,874 B2 | 8/2012 | Pavlovic et al. |
| 8,289,123 B2 | 10/2012 | Whitney et al. |
| 8,604,342 B2 | 12/2013 | Solon |
| 8,632,358 B2 | 1/2014 | Leonhard et al. |
| 8,657,624 B2 | 2/2014 | Yoshida |
| 8,699,209 B2 | 4/2014 | Barna |
| 8,723,370 B2 | 5/2014 | West |
| 8,779,627 B2 | 7/2014 | Gerhardinger et al. |
| 8,853,520 B2 | 10/2014 | Ueda et al. |
| 8,911,264 B2 | 12/2014 | Goyal et al. |
| 8,937,249 B2 | 1/2015 | Solon |
| 9,437,985 B2 | 9/2016 | Goyal et al. |
| 9,564,281 B2 | 2/2017 | Gilman et al. |
| 9,648,762 B2 | 5/2017 | Boe |
| 10,553,739 B1 | 2/2020 | Solon |
| 10,992,254 B2 | 4/2021 | Solon |
| 11,689,153 B2 | 6/2023 | Solon |
| 2002/0041944 A1 | 4/2002 | Stavnes et al. |
| 2005/0077994 A1 | 4/2005 | Martin et al. |
| 2005/0110607 A1 | 5/2005 | Babic et al. |
| 2007/0132539 A1 | 6/2007 | Richter et al. |
| 2008/0011347 A1 | 1/2008 | Aoyama et al. |
| 2009/0088032 A1 | 4/2009 | Keeven et al. |
| 2009/0291594 A1 | 11/2009 | Donth et al. |
| 2009/0300909 A1 | 12/2009 | Kummer et al. |
| 2010/0090851 A1 | 4/2010 | Hauser |
| 2010/0139733 A1 | 6/2010 | Jonczyk et al. |
| 2010/0207716 A1 | 8/2010 | Yen |
| 2010/0258157 A1 | 10/2010 | Arai |
| 2011/0011642 A1 | 1/2011 | Solon |
| 2011/0104925 A1 | 5/2011 | Quiter et al. |
| 2011/0174521 A1 | 7/2011 | Hernandez-Hernandez et al. |
| 2011/0209741 A1 | 9/2011 | Solon |
| 2011/0232963 A1 | 9/2011 | Kono et al. |
| 2011/0300730 A1 | 12/2011 | Someya |
| 2011/0308833 A1 | 12/2011 | West |
| 2012/0019346 A1 | 1/2012 | Levi |
| 2012/0085040 A1 | 4/2012 | Ketwitz, Jr. |
| 2012/0125395 A1 | 5/2012 | Bellacicco et al. |
| 2012/0161919 A1 | 6/2012 | Von zur Muehlen |
| 2012/0181973 A1 | 7/2012 | Lyden |
| 2012/0217973 A1 | 8/2012 | Avrutsky |
| 2012/0309232 A1 | 12/2012 | Darr et al. |
| 2012/0313278 A1 | 12/2012 | Nishio et al. |
| 2013/0037294 A1 | 2/2013 | Blaha et al. |
| 2013/0077249 A1 | 3/2013 | Guinn |
| 2013/0257154 A1 | 10/2013 | Tagliamonte |
| 2013/0269746 A1 | 10/2013 | Ramsey |
| 2014/0113500 A1 | 4/2014 | Goyal et al. |
| 2016/0133422 A1 | 5/2016 | Breili |
| 2016/0149539 A1 | 5/2016 | Franke et al. |

FOREIGN PATENT DOCUMENTS

| | | | |
|---|---|---|---|
| CN | 1395056 | | 2/2003 |
| CN | 2562350 | | 7/2003 |
| CN | 2785100 | | 5/2006 |
| CN | 201134283 | | 10/2008 |
| CN | 101527235 | | 9/2009 |
| CN | 101577158 | | 11/2009 |
| CN | 201518320 | | 6/2010 |
| CN | 101923915 | | 12/2010 |
| CN | 201845580 | | 5/2011 |
| CN | 201877150 | | 6/2011 |
| CN | 102117976 | | 7/2011 |
| CN | 201975362 | | 9/2011 |
| CN | 201994507 | | 9/2011 |
| CN | 102332345 | | 1/2012 |
| CN | 202153443 | | 2/2012 |
| CN | 202256574 | | 5/2012 |
| CN | 202258411 | | 5/2012 |
| CN | 102568970 | | 7/2012 |
| CN | 202434452 | | 9/2012 |
| CN | 202524026 | | 11/2012 |
| CN | 202758911 | | 2/2013 |
| CN | 103000468 | | 3/2013 |
| CN | 202797033 U | | 3/2013 |
| CN | 103165235 | | 6/2013 |
| CN | 202977351 | | 6/2013 |
| CN | 203038709 | | 7/2013 |
| CN | 203118602 | | 8/2013 |
| CN | 104021860 | | 9/2014 |
| CN | 203967369 | | 11/2014 |
| CN | 104464920 | | 3/2015 |
| CN | 204463897 | | 7/2015 |
| CN | 204760094 | | 11/2015 |
| DE | 6940839 | | 4/1971 |
| DE | 202006007613 U1 | | 8/2006 |
| DE | 102006032275 | | 1/2008 |
| DE | 102008027189 A1 | | 1/2009 |
| DE | 102012218366 | | 2/2014 |
| DE | 102013106255 | | 12/2014 |
| EP | 2287915 | | 2/2011 |
| EP | 2495825 | | 9/2012 |
| EP | 2645425 | | 10/2013 |
| FR | 2983361 A1 | | 5/2013 |
| JP | S59194327 | | 11/1984 |
| JP | S60236430 | | 11/1985 |
| JP | H02023016 A * | | 1/1990 |
| JP | H0684410 | | 3/1994 |
| JP | 3004630 | | 11/1994 |
| JP | H08289450 | | 11/1996 |
| JP | H08289451 | | 11/1996 |
| JP | H09245533 | | 9/1997 |
| JP | 2000004516 | | 1/2000 |
| JP | 2000348836 | | 12/2000 |
| JP | 2003031834 | | 1/2003 |
| JP | 2003077584 | | 3/2003 |
| JP | 2003293536 A | | 10/2003 |
| JP | 2005039981 | | 2/2005 |
| JP | 4044484 | | 2/2008 |
| JP | 4080663 | | 4/2008 |
| JP | 2008166492 | | 7/2008 |
| JP | 2008187814 | | 8/2008 |

(56) References Cited

FOREIGN PATENT DOCUMENTS

| | | | |
|---|---|---|---|
| JP | 4169490 | 10/2008 | |
| JP | 4171359 | 10/2008 | |
| JP | 4606774 | 1/2011 | |
| JP | 4730794 | 7/2011 | |
| JP | 2011253739 | 12/2011 | |
| JP | 2012115043 | 6/2012 | |
| JP | 5384073 | 1/2014 | |
| JP | 2014050227 A * | 3/2014 | |
| JP | 2014229639 | 12/2014 | |
| JP | 2015060813 | 3/2015 | |
| JP | 2015133822 | 7/2015 | |
| JP | 2015198508 A * | 11/2015 | |
| KR | 200329882 | 10/2003 | |
| KR | 200446192 | 10/2009 | |
| KR | 200455299 | 8/2011 | |
| KR | 10-1428689 | 8/2014 | |
| MX | 2011013979 | 6/2012 | |
| WO | 8400078 | 1/1984 | |
| WO | 90/011608 | 10/1990 | |
| WO | WO-0109990 A1 * | 2/2001 | ....... B29C 45/14639 |
| WO | 2010124614 | 11/2010 | |
| WO | 2011076955 | 6/2011 | |
| WO | 2012/023748 A2 | 2/2012 | |
| WO | 2012/083785 A1 | 6/2012 | |
| WO | 2012166412 | 6/2012 | |

OTHER PUBLICATIONS

Machine translation of JPH2-023016A (Year: 1990).*
Definition of "working voltage" [retrieved from https://encyclopedia2.thefreedictionary.com/voltage+rating on Sep. 18, 2018].
"Wire Gauges—Current Ratings" [retrieved from https://web.archive.com/org/web/20140715051530/www.engineeringtoolbox.com/wire-gauges-d_419.html on Jun. 6, 2019] (Year: 2015).
PRNewswire, Molded In-line Fuse From Amphenol Protects Against Ground Fault Damage, published May 4, 2012, retrieved Dec. 22, 2022 from: https://www.prnewswire.com/news-releases/molded-in-line-fuse-from-amphenol-protects-against-ground-fault-damage-150186315.html.
Balance of Systems Product Catalog 2012, Shoals Technologies Group.
Balance of Systems Product Catalog 2013, Shoals Technologies Group.
Enphase Engage Cable and Accessories Installation Manual, Enphase Energy, 2011.
HelioFuse Datasheet, Amphenol.
Helukabel "Cable systems for photovoltaic installations" and product disclosures, Helukabel, 2011.
Jurchen Technology—Components for photovoltaic systems, retrieved from http://web.archive.org/web/20120428223249/http://www.jurchen-technology.com/ on 2012.
Jurchen Technology—Components for photovoltaic systems, retrieved from http://web.archive.org/web/20140208150811/http://www.jurchen-technology.com/ on Oct. 9, 2023.
Jurchen Technology "DC Cabling Perfectly Connected", 2014.
Radox® Solar, Huber+Suhner Group, 2011 Ed.
Shoals Technologies Group In-Line Fuses, 2010.
Solar Line—Photovoltaic interconnection system, Amphenol industrial solar technologies, https://www.amphenol-industrial.com, Nov. 2012.
Sunbolts Inline Fuse S417 Fuse Cable / Fuse Holder UL 1500V, https://www.bizlinktech.com/products, 2013.
Sunnector Solar Assemblies & Harnesses, Cooper Interconnect, 2011.
The World of Lapp—Products for photovoltaic 2012, Lapp Group, 2012.

* cited by examiner

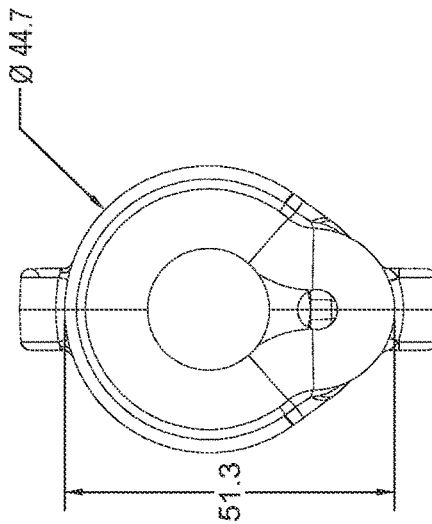
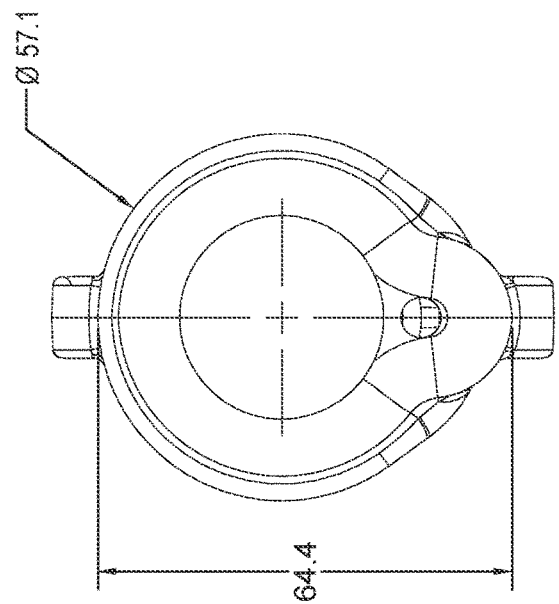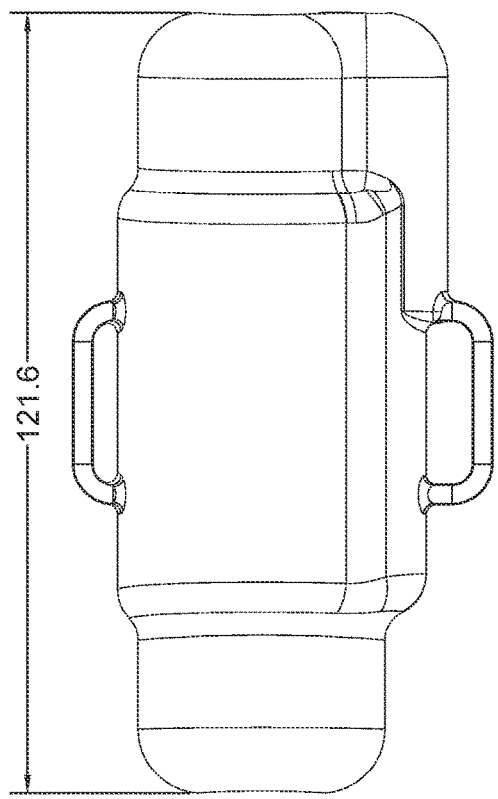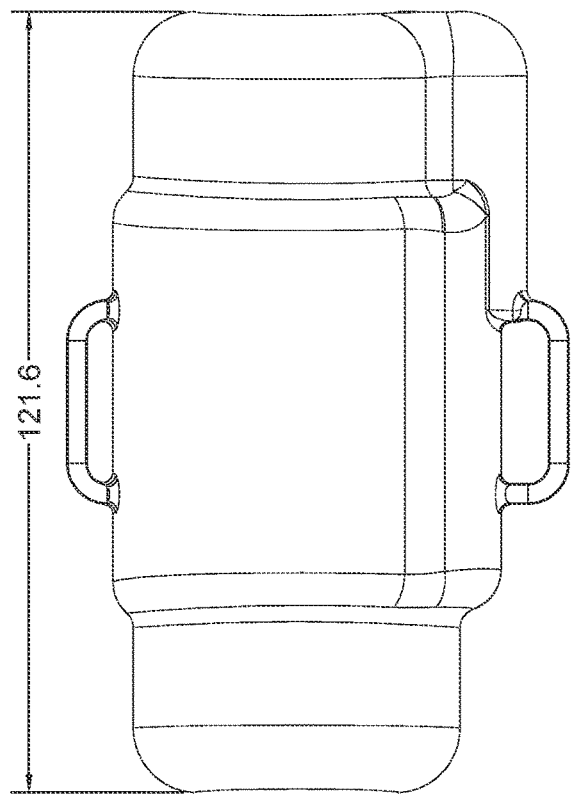

LEAD ASSEMBLY FOR CONNECTING SOLAR PANEL ARRAYS TO INVERTER

CROSS-REFERENCE TO RELATED APPLICATIONS

This application is a Continuation application of Ser. No. 17/301,609, filed Apr. 8, 2021, entitled LEAD ASSEMBLY FOR CONNECTING SOLAR PANEL ARRAYS TO INVERTER, which is a Continuation application of Ser. No. 14/849,458, filed Sep. 9, 2015, entitled LEAD ASSEMBLY FOR CONNECTING SOLAR PANEL ARRAYS TO INVERTER, which claims the benefit of and priority from the United States provisional patent application entitled PRE-PANELIZED THIN FILM, RACK, CONNECTOR LESS DUAL CORD PLATE, MOBILE SKIDGET, POWERHOUSE AND BLA TRUNK BUSS, which was filed on Sep. 9, 2014, and assigned the Ser. No. 62/047,773, all of which are incorporated herein by reference in their entireties.

BACKGROUND

Disclosed embodiments relate to electrical components, and more specifically to assemblies for connecting solar panel arrays to an inverter, without the need of a combiner box.

As depicted in FIG. 1, a conventional solar power configuration includes a plurality of solar panels 30 each connected to a central combiner box 36, and a plurality of combiner boxes (not shown) connected to an inverter. The inverter converts the direct current (DC) generated by the solar panels into alternating power (AC), which goes in the "grid".

The configuration of FIG. 1 has been simplified in recent years by the wire harness of U.S. Pat. No. 8,604,342 which issued Dec. 10, 2013; and U.S. application Ser. No. 14/057,089 filed Oct. 18, 2013; and Ser. No. 14/296,726 filed Jun. 5, 2014, all of which are hereby incorporated by reference. More specifically, as shown in FIG. 2, wire harnesses 34 connect multiple solar panels 30 in an array 32, so each array has a single input via wire harness 34 into the combiner box. This has drastically reduced the number of connections going into a combiner box, which is safer, more reliable, easier to install, maintain and troubleshoot, and saves money over the conventional configuration of FIG. 1.

Unfortunately, however, a combiner box is still a necessary component in known solar power installations because the energy coming from solar arrays must be combined prior to going into the inverter. Combiner boxes are problematic because they are clumsy, prone to damage and malfunctioning, must be periodically maintained, and require extensive planning and skill for installation. Due to the many connections going into a combiner box, a combiner box cannot easily be moved without disconnecting and reconnecting all the connections and wiring, which requires considerable manpower, danger, and expense.

As can be seen, there is a need for a device that renders a combiner box unnecessary. It is desirable that this device is small, inexpensive to manufacture and transport, and easy to use. It is also desirable that the device is extremely durable and can be adapted for a variety of circumstances.

SUMMARY OF DISCLOSED EMBODIMENTS

Disclosed embodiments are directed to a lead assembly including at least one drop line joined to a feeder cable at a nexus. The assembly is preferably undermolded and overmolded at the nexus. In use, the drop line is connected to solar arrays, and the feeder cable is connected to an inverter, or to a buss trunk jumper, which connects to the inverter. In this manner a plurality of solar arrays are electrically coupled together, with a common feeder cable connecting them all to the inverter. Alternatively, a plurality of feeder cables can be connected end to end, optionally terminating in a buss trunk jumper, for connection to an inverter. A combiner box is not necessary, and in fact would be redundant. In line fuses may be integrated into drop lines.

The terminal end of each drop line includes a drop line connector for fast and easy connection to the wire harness that interconnects the solar panels of a solar array. A lead assembly preferably includes one or two drop lines, depending on the particular configuration in a solar field. A lead assembly preferably includes a capping end piece at one end of the feeder cable, and a feeder cable connector at the other end. The feeder cable connector would plug into an inverter, buss trunk jumper, or possibly another feeder cable.

BRIEF DESCRIPTION OF THE DRAWINGS

FIGS. 19-20 depict the overmold for a single drop lead assembly for 250 MCM cable;

FIGS. 21-22 depict the overmold for a single drop lead assembly for 750 MCM cable;

DETAILED DESCRIPTION OF EXAMPLE EMBODIMENTS

The following detailed description describes exemplary embodiments of the invention. The description is not to be taken in a limiting sense but is made merely for the purpose of illustrating the general principles of the invention, since the scope of the invention is best defined by the appended claims.

The following structure numbers shall apply to the following structures among the various FIGS.:

10—Lead assembly;
12—Drop line;
13—Drop line connector,
14—Feeder cable;
15—Feeder cable connector;
16—Insulation;
17—Joint;
18—Exposed wire;
19—Nexus;
20—Compression lug;
22—Undermold;
24—Overmold;
25—Aperture;
27—Trunk buss jumper;
29—In line fuse;
30—Solar panel;
32—Solar array;
34—Wire harness;
35—Wire harness connector;
36—Combiner box; and
38—Inverter.

Figure 1:
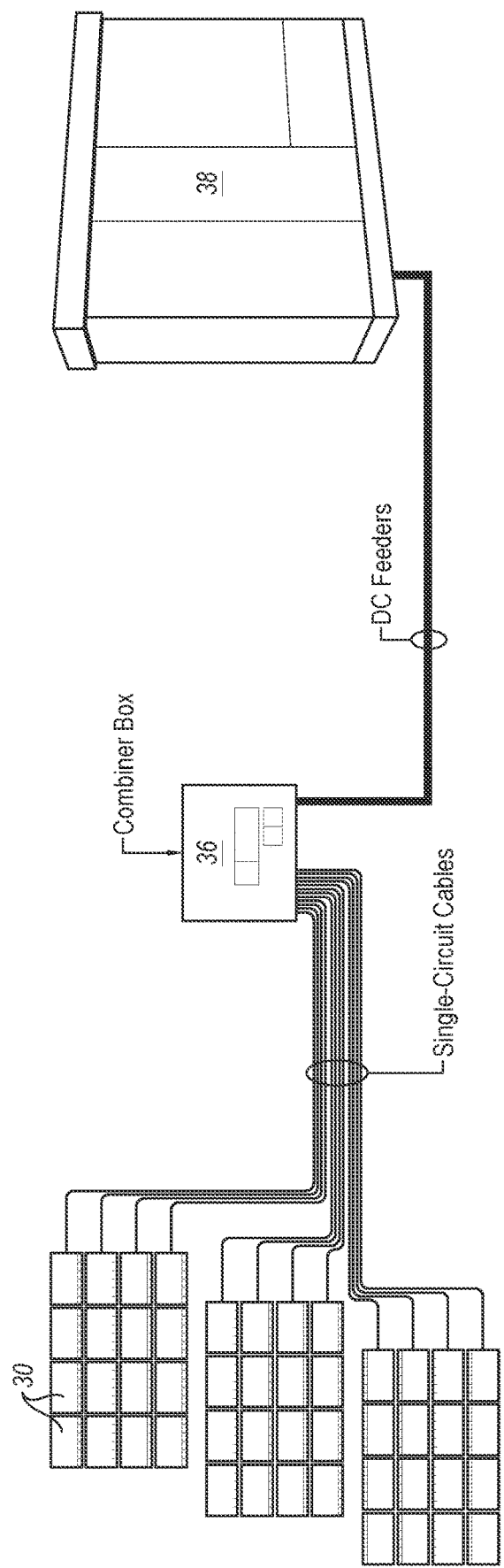
FIG. 1 depicts a conventional wiring configuration with each solar panel individually wired to a central combiner box.
Figure 2:
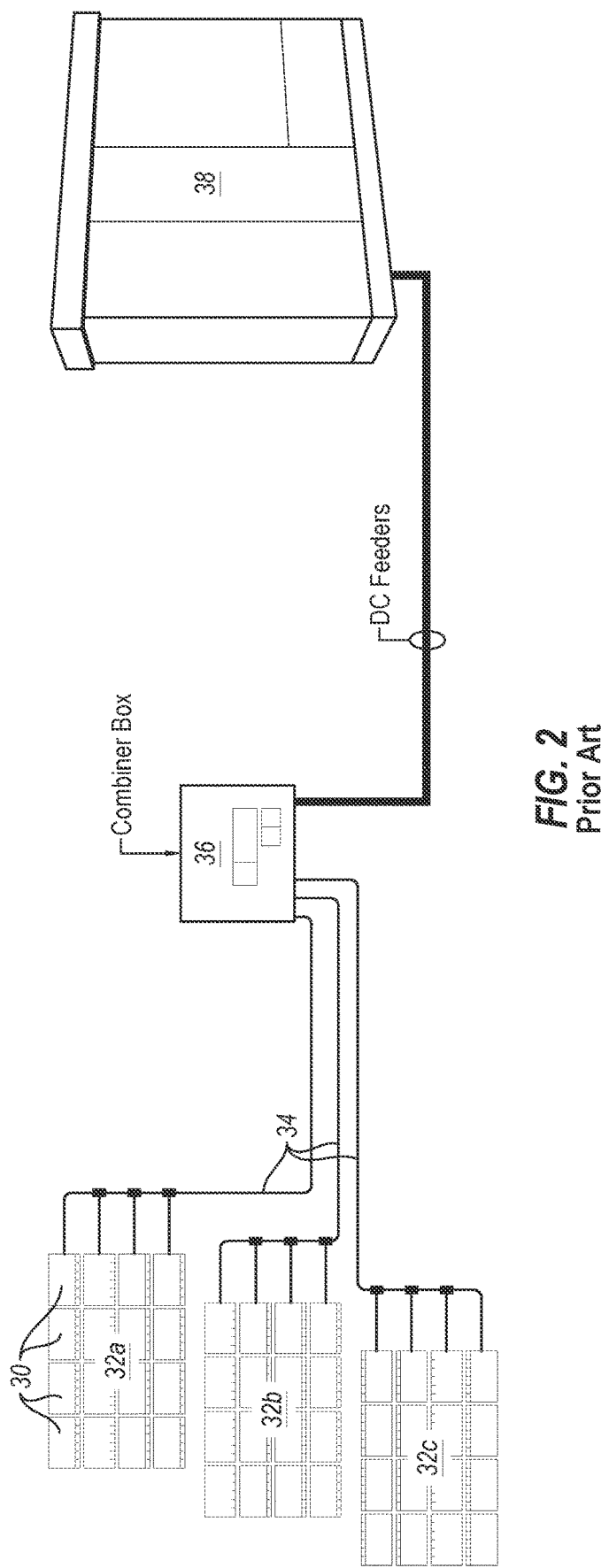
FIG. 2 depicts an improved but known wiring configuration with solar panels harnessed together to form solar arrays, with each solar array individually wired to a central combiner box.
Figure 3:
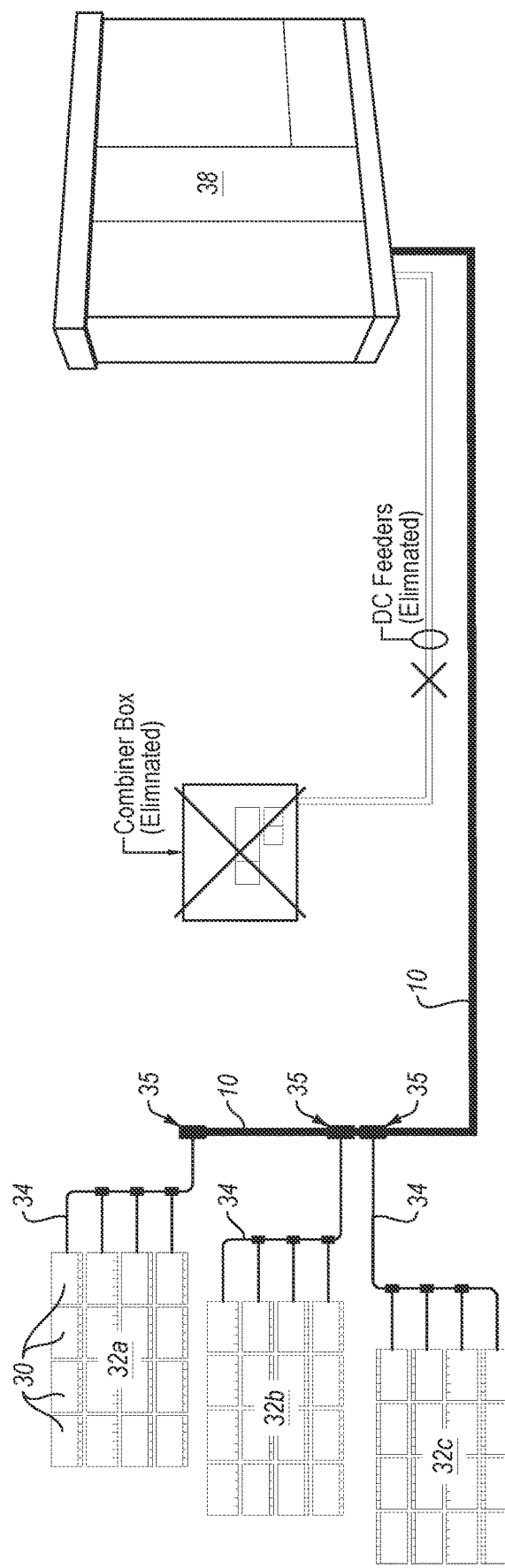
FIG. 3 depicts the present invention of a plurality of wire harnesses coupled to a lead assembly that connects to an inverter, with the unnecessary combiner box shown for demonstration only.
Figure 4:
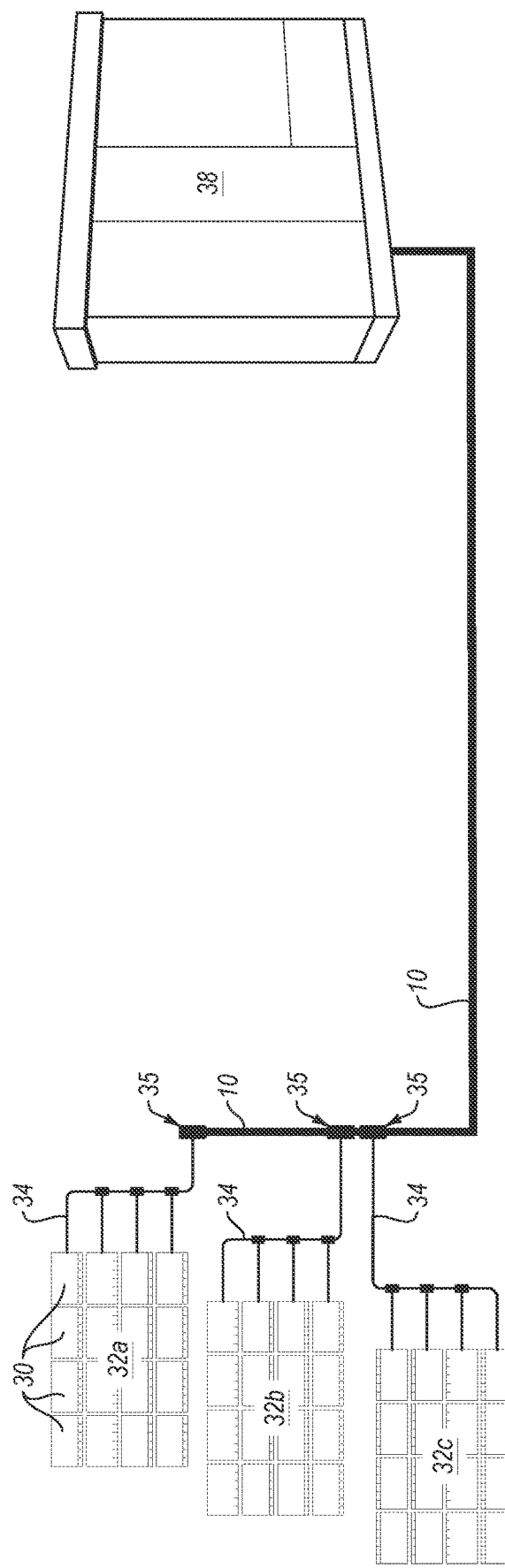
FIG. 4 schematically represents a system of the present invention.

Referring to FIG. 3, a system of the present invention generally includes a plurality of solar panels 30 that are electrically coupled to form solar arrays 32a, 32b, and so forth. Panels 30 are preferably coupled using wire harnesses 34 which are commercially available from Shoals Technologies Group of Portland, TN. Each wire harness includes a plurality of branches each connecting to one solar panel, and a central trunk that terminates in wire harness connector 35. Each wire harness is connected at wire harness connector 35 to drop line connector 13 (not shown) of lead assembly 10.

As shown in FIG. 3, solar arrays 32a, 32b and 32c are connected to a lead assembly 10. A single lead assembly 10 can reasonably accommodate approximately 200 Kw.

Figure 5:
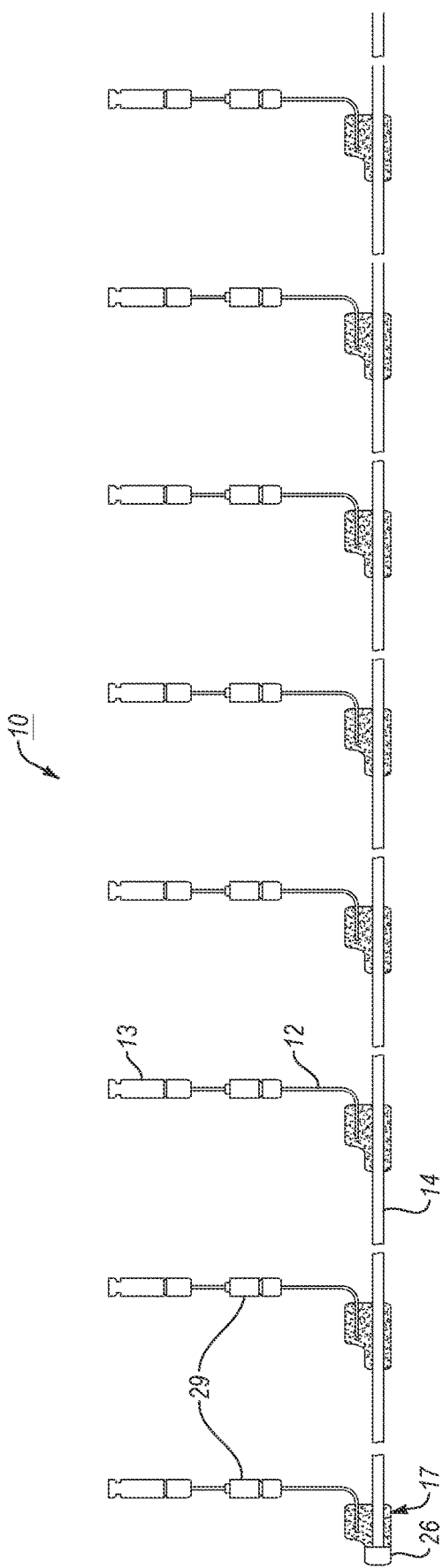
FIG. 5 depicts a positive lead assembly having a single drop line per joint.
Figure 6:
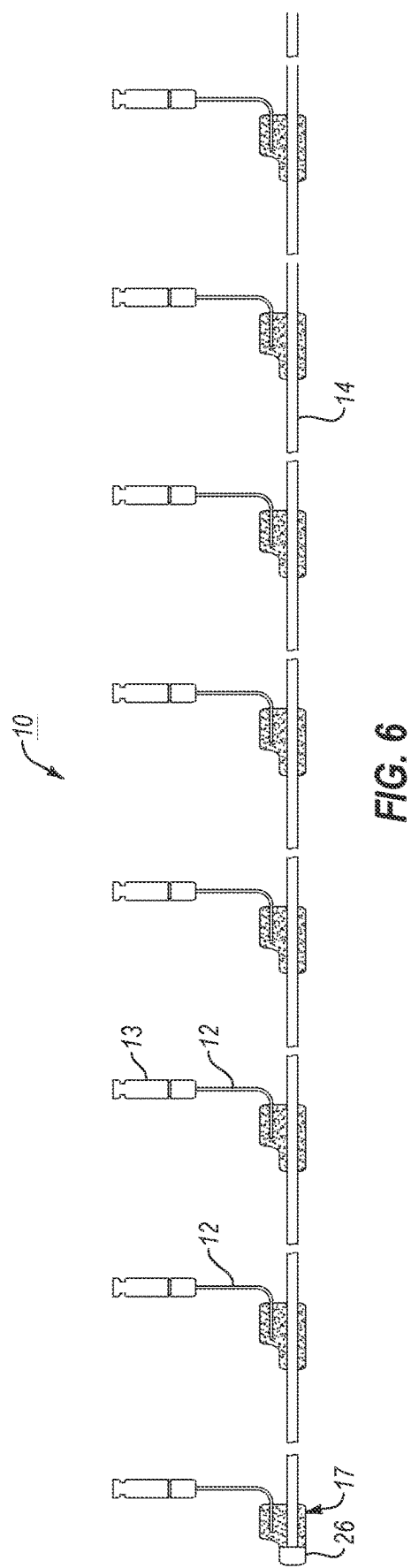
FIG. 6 depicts a negative lead assembly having a single drop line per joint.
Figure 7:
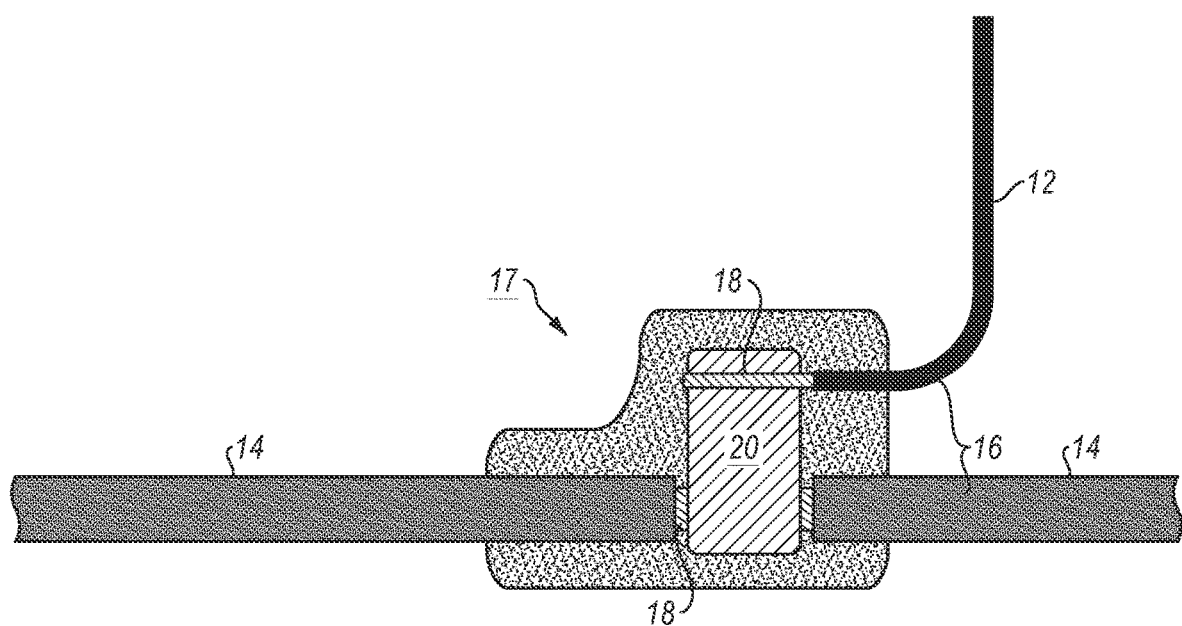
FIG. 7 schematically depicts a joint with a compression lug.
Figure 8:
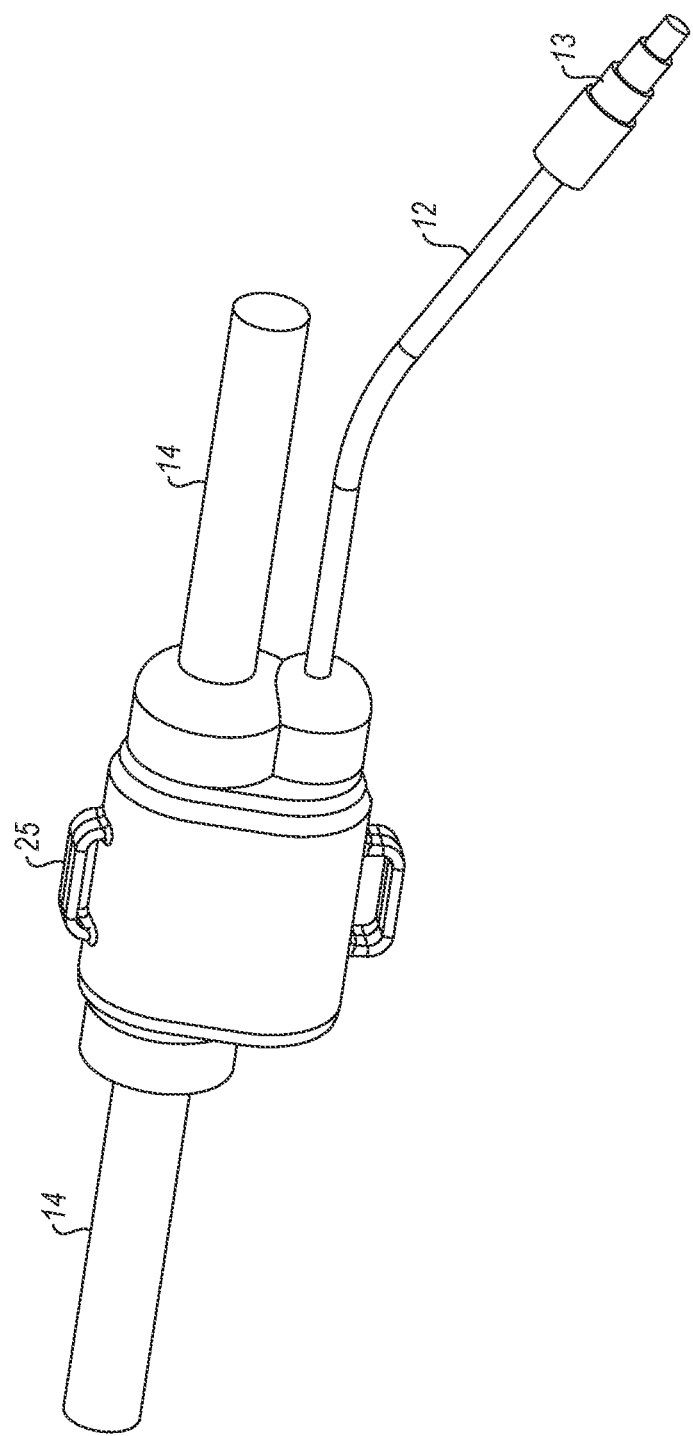
FIG. 8 depicts a single drop joint.

While FIG. 5 depicts a positive lead assembly having in line fuses 29, and FIG. 6 depicts a negative lead assembly without in line fuses, it should be understood that positive lead assemblies may lack in line fuses and negative lead assemblies may include in line fuses.

Figure 29:
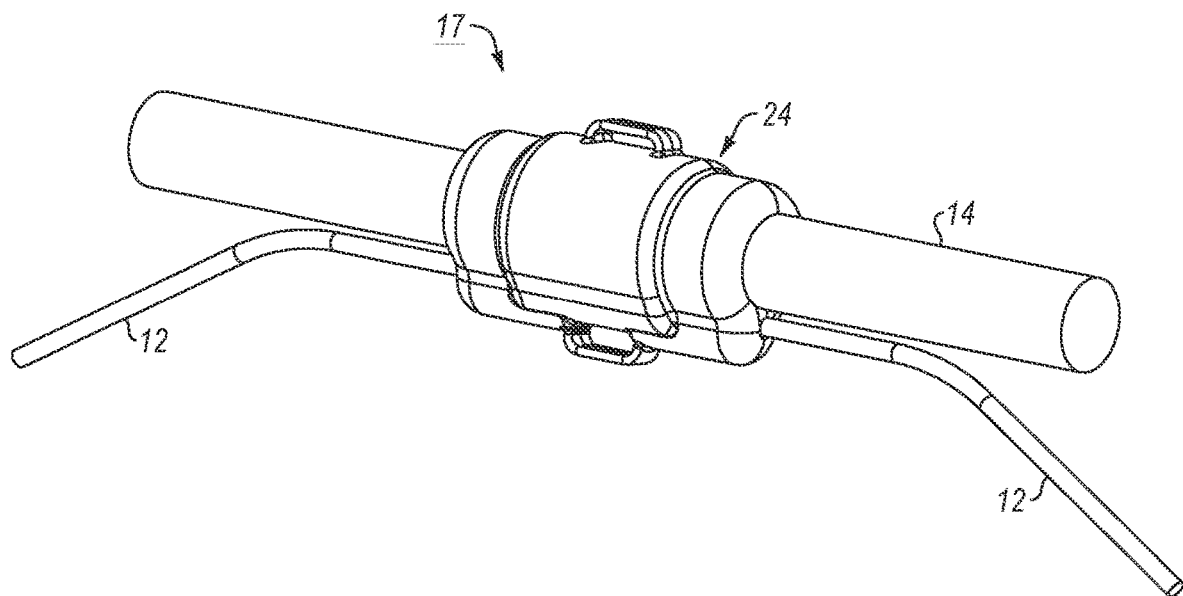
FIG. 29 depicts a dual drop lead assembly for 750 MCM cable.
Figure 33:
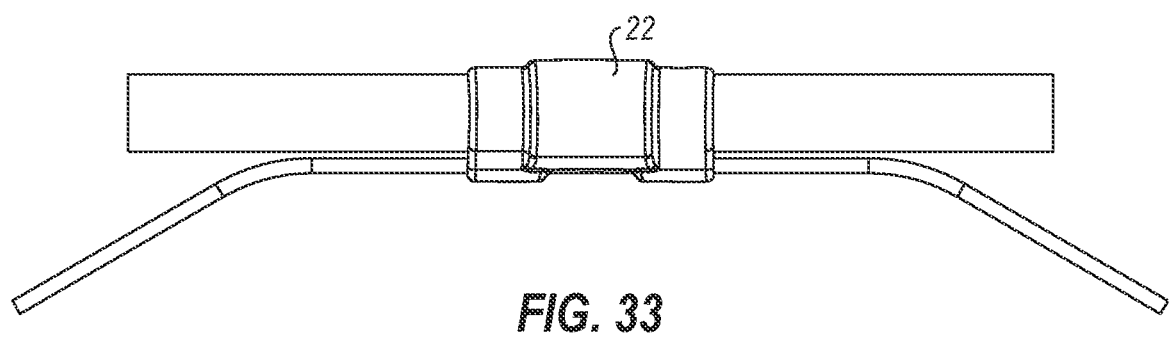
FIG. 33 depicts a dual drop lead assembly for 750 MCM cable with undermold shown.
Figure 34:
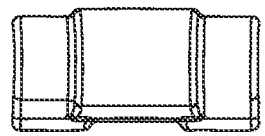
FIG. 34 depicts the undermold for a dual drop lead assembly for 750 MCM cable.
Figure 35:
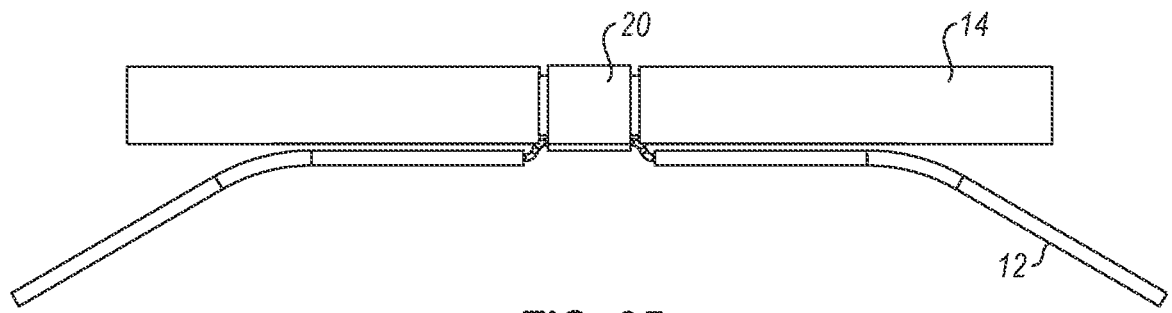
FIG. 35 depicts a dual drop lead assembly for 750 MCM cable with compression lug shown.
Figure 36:
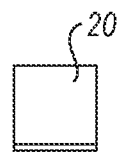
FIG. 36 depicts the compression lug for a dual drop lead assembly for 750 MCM cable.

Referring now to FIG. 5, lead assembly 10 generally includes drop line 12 joined to feeder cable 14 at joint 17. As shown in FIG. 35, the drop line and feeder cable are held together by compression lug 20, which is surrounded by undermold 22 (FIG. 33), which is surrounded by overmold 24 (FIG. 29). Overmold 24 preferably defines at least one aperture 25 for receiving zip-ties, and the like, for securing the assembly upon installation.

Figure 30:
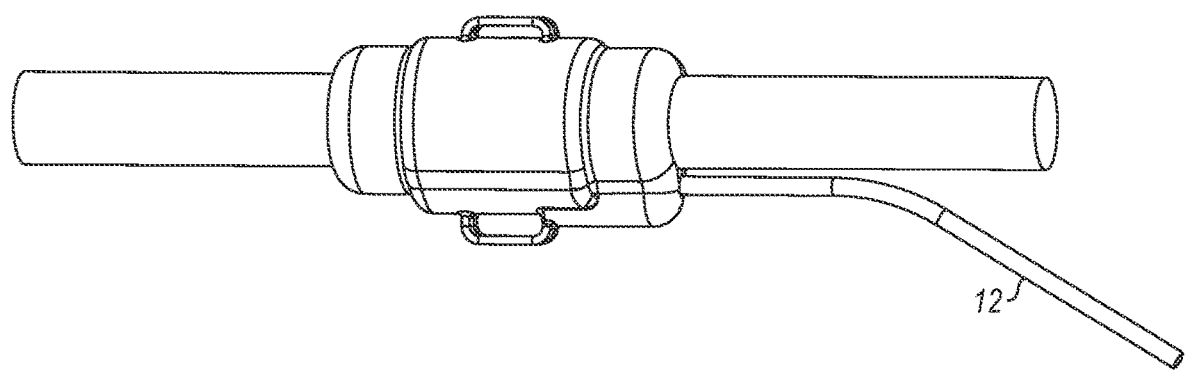
FIG. 30 depicts a single drop lead assembly for 750 MCM cable.
Figure 31:
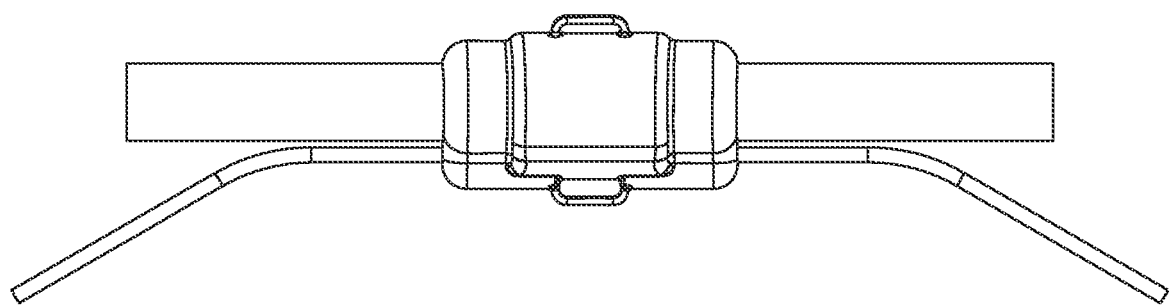
FIG. 31 depicts a dual drop lead assembly for 750 MCM cable with overmold shown.
Figure 32:
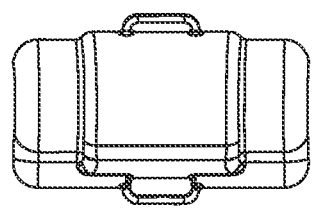
FIG. 32 depicts the overmold for a dual drop lead assembly for 750 MCM cable.

Each drop line 12 terminates in drop line connector 13, which connects drop line 12 to wire harness connector 35. Drop line 12 is preferably constructed of 18 to 4 gauge wire, and drop line connectors 13 are preferably off-the-shelf connectors such as MC4/PV-KBT4/61-UR & PV-KST4/61-UR from Multi-Contact of Windsor, CA. Joint 17 of lead assembly 10 may include a single drop line 12, as shown in FIG. 30, or dual drop lines 12, as shown in FIG. 29, corresponding with connecting to a single wire harness or two wire harnesses, respectively. Whether a single or dual drop line is most suitable depends on the configuration of the solar arrays in a field.

Figure 9:
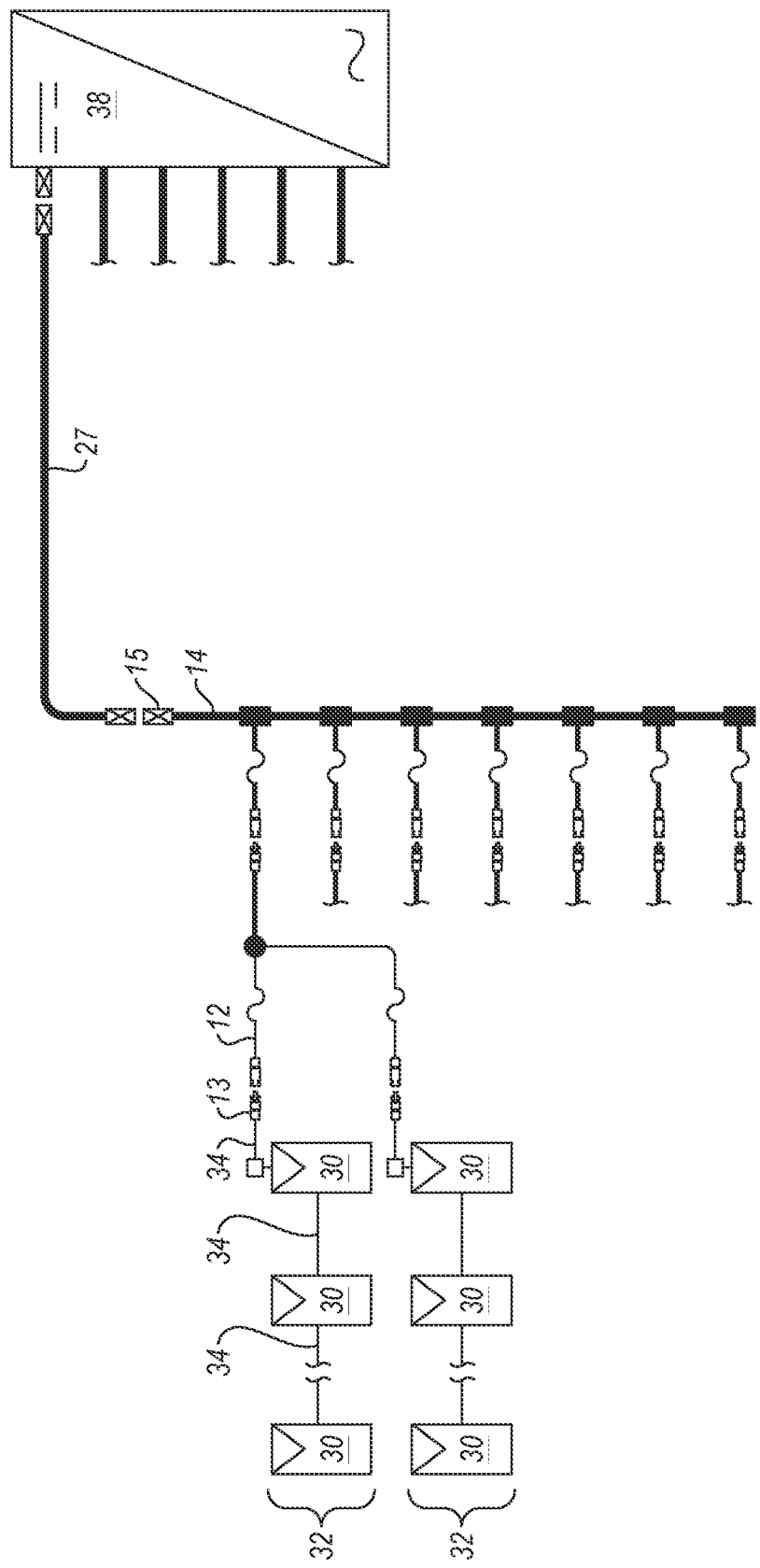
FIG. 9 depicts a configuration where a lead assembly has a single drop line as may be appropriate in use with crystalline panels.
Figure 10:
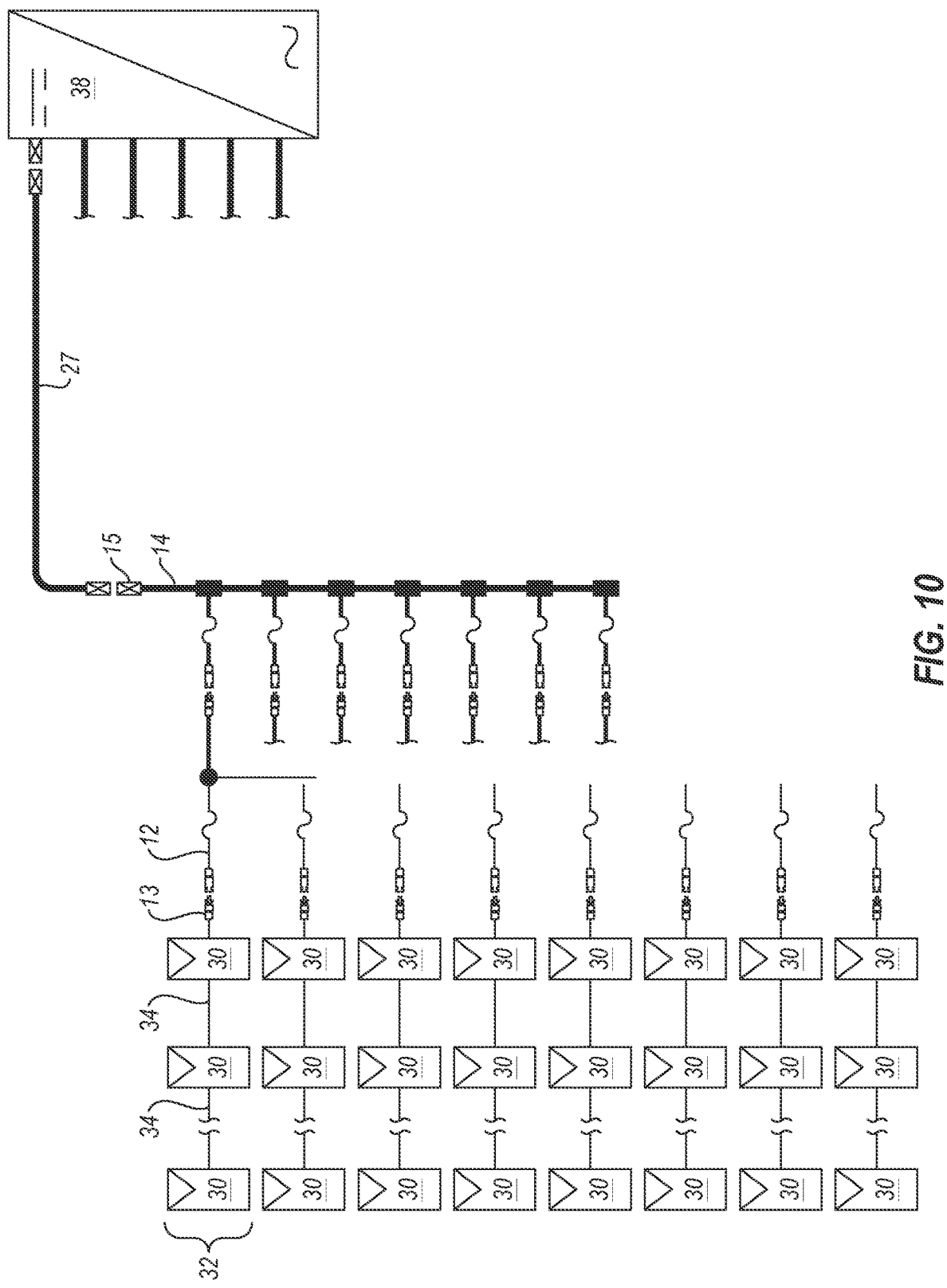
FIG. 10 depicts a configuration where a lead assembly has a single drop line as may be appropriate in use with thin film panels.
Figure 12:
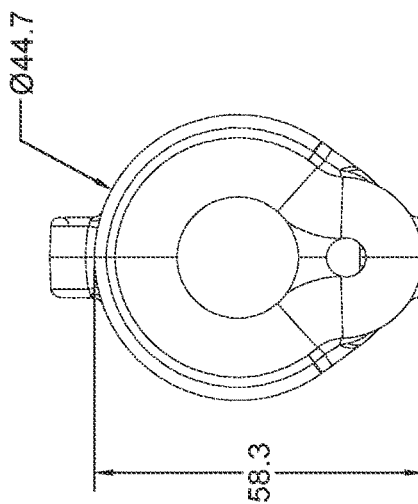
FIGS. 11-12 depict the overmold for a dual drop lead assembly for 250 mcm cable.
Figure 14:
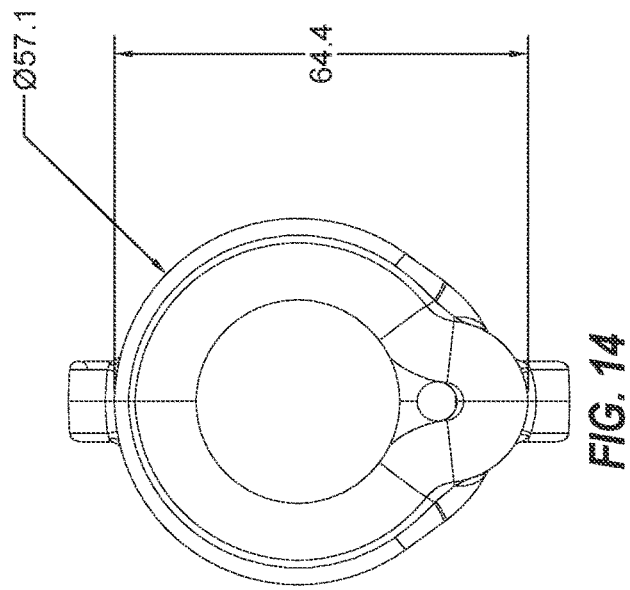
FIGS. 13-14 depict the overmold for a dual drop lead assembly for 750 MCM cable.
Figure 11:
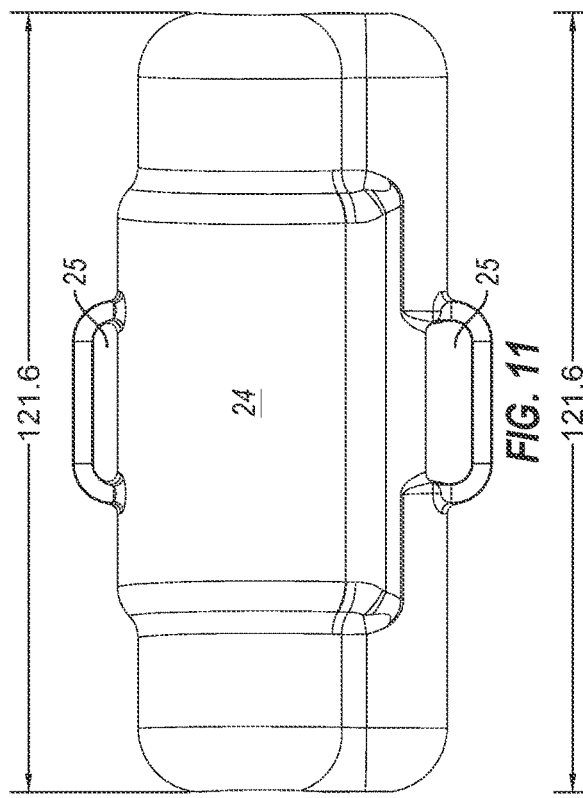
Figure 13:
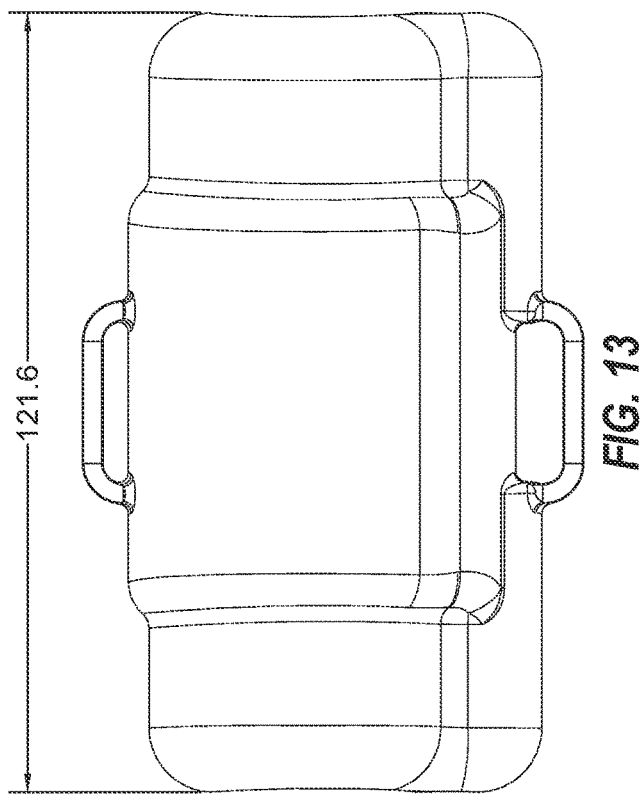
Figure 16:
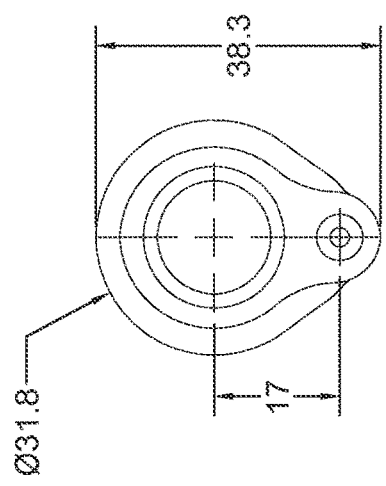
FIGS. 15-16 depict the undermold for a dual drop lead assembly for 250 MCM cable.
Figure 18:
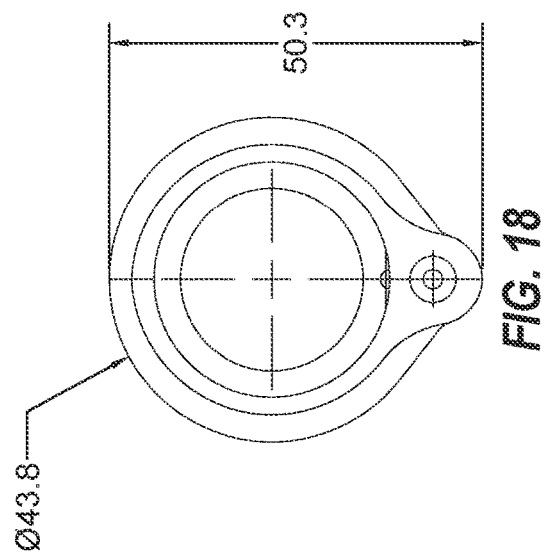
FIGS. 17-18 depict the undermold for a dual drop lead assembly for 750 MCM cable.
Figure 15:
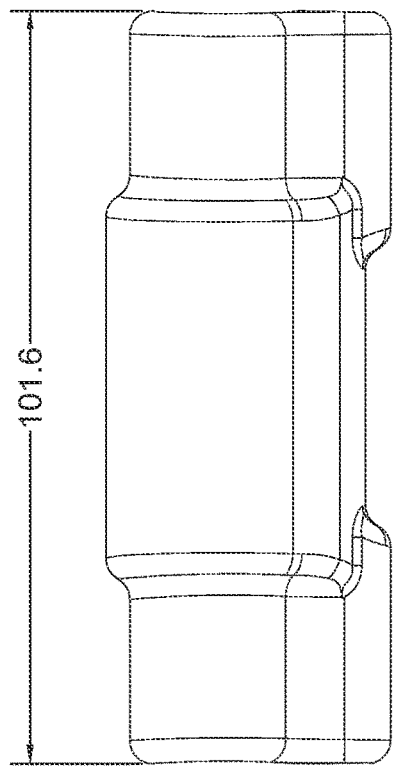
Figure 17:
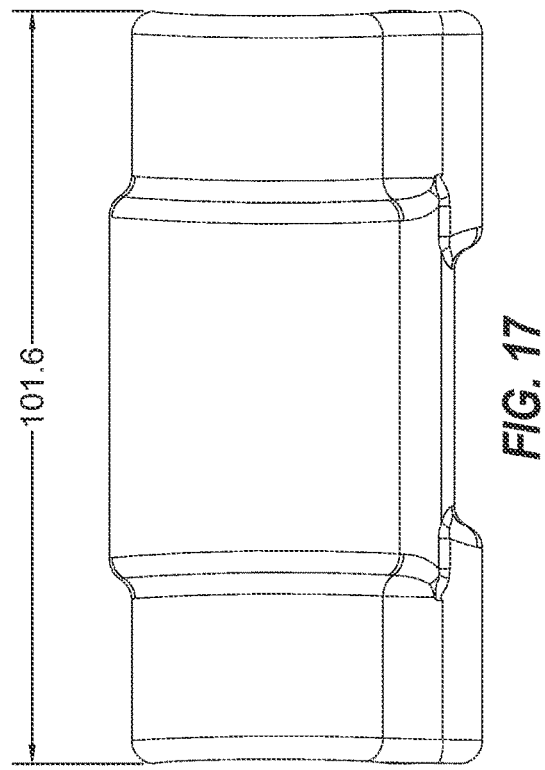
Figure 24:
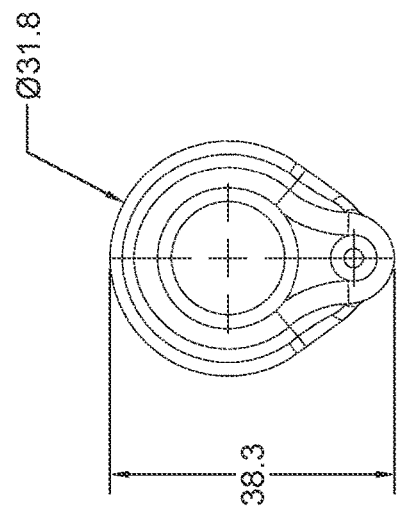
FIGS. 23-24 depict the undermold fora single drop lead assembly for 250 MCM cable.
Figure 26:
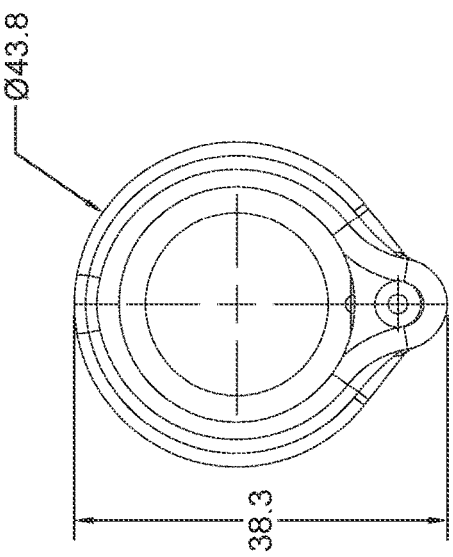
FIGS. 25-26 depict the undermold for a single drop lead assembly for 750 MCM cable.
Figure 23:
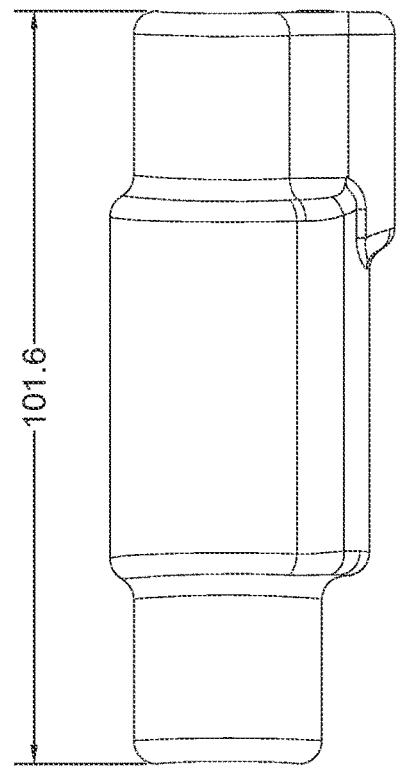
Figure 25:
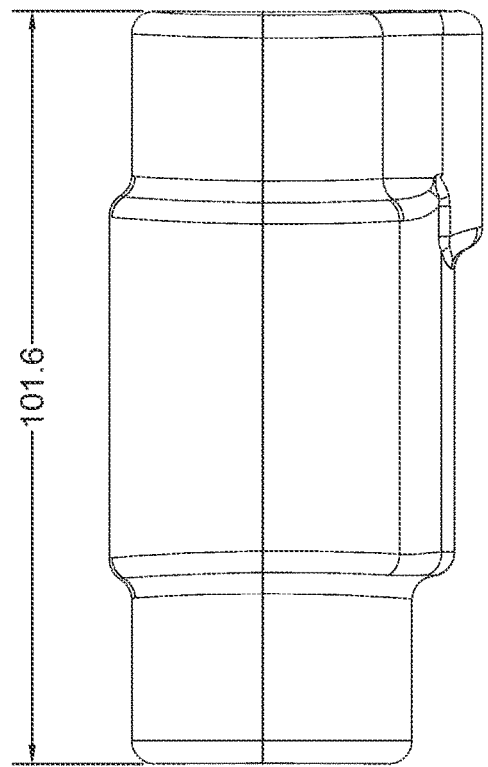

By way of example and referring to FIG. 10, in a solar installation having thin film panels, which occupy a large area of space, it may be advantageous to employ single drop assemblies because it is impractical to physically reach wire harnesses that are very spread out. Alternatively and referring to FIG. 9, in a solar installation having crystalline panels, which occupy a smaller area of space, it may be advantageous to employ dual drop assemblies because the associated wire harnesses are relatively close to one another and can be connected to a single lead assembly.

It is also important to understand that the configuration of a particular lead assembly can be modified to accommodate different solar installations. For example, joints 17 and corresponding drop lines 12 can be spaced close together (approximately 15 cm), or far apart (approximately 15000 cm), along feeder cable 14, depending on the density of solar panels. Also, spacing of joints 17 and corresponding drop lines 12 can vary on a single lead assembly.

Figure 27:
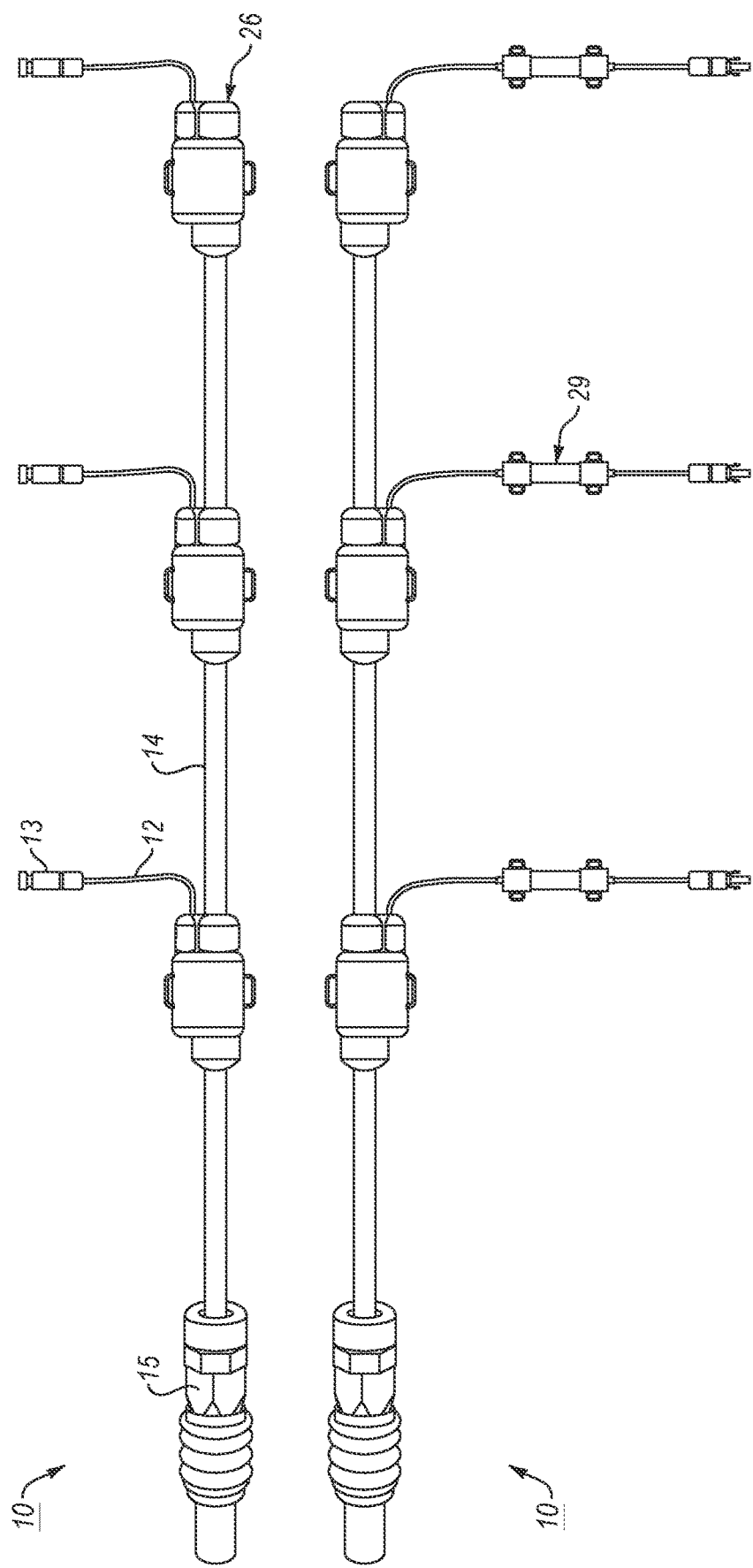
FIG. 27 depicts two lead assemblies with single drop, with the lower assembly including in line fuses.
Figure 28:
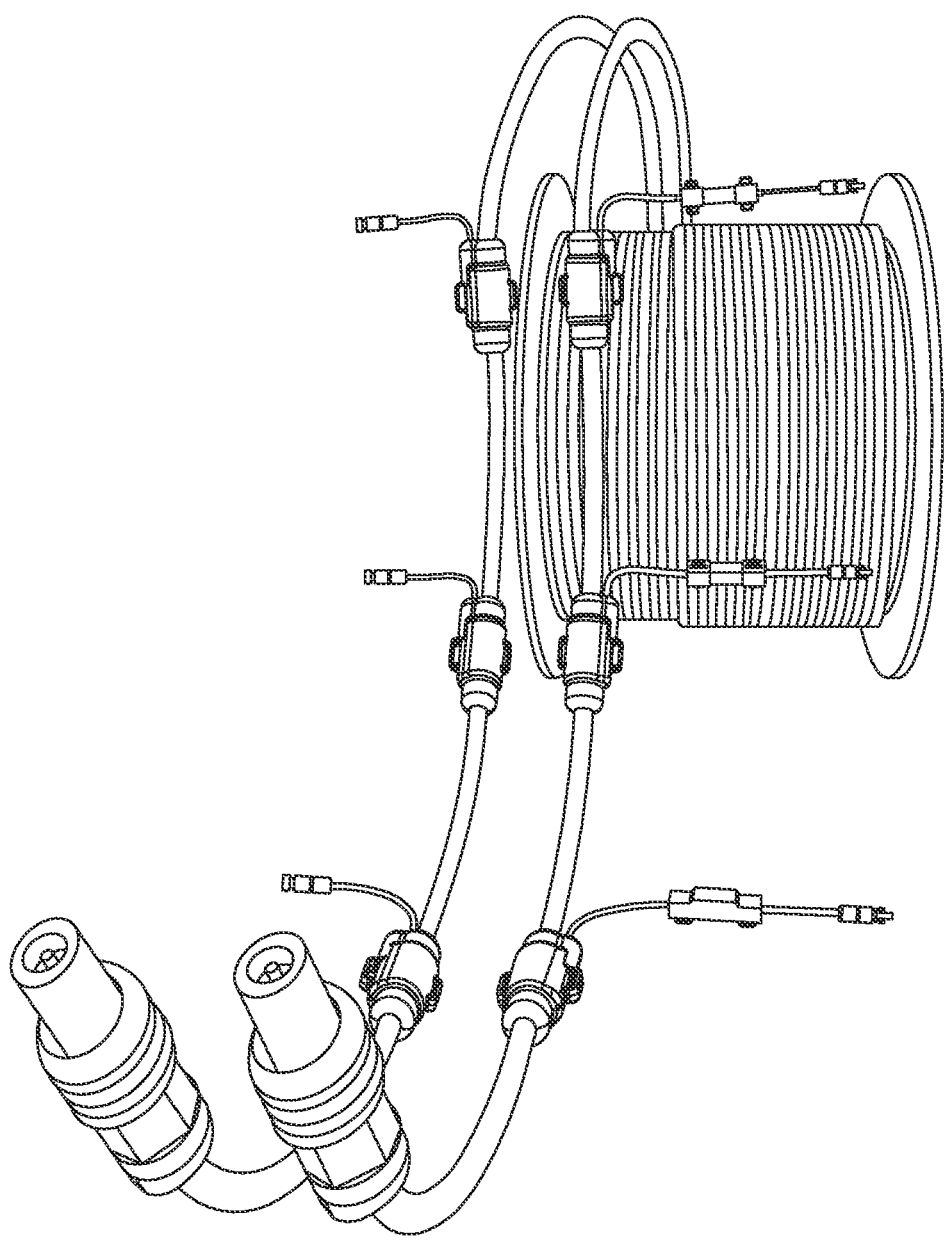
FIG. 28 depicts a spooled lead assembly with single drop.

Each feeder cable 14 terminates in feeder cable connector 15, which connects to trunk buss jumper 27 (FIG. 27), to inverter 38 (FIG. 3), or to connection unit, recombiner, or disconnect unit (not shown). Trunk buss jumper 27 is essentially an "extension cord" which is economical to use in some configurations, for example where portions of feeder cable 14 are installed at different times. In another situation, trunk buss jumper 27 could be buried underground and feeder cable 14 above ground. Being able in install these components independent of one another can offer much more diversity. Trunk buss jumper 27 could also be utilized if there are a significant number of varying lengths from solar array 32 to inverter 38. Trunk buss jumper 27 could also be utilized if there is a substantial distance (greater than >50 meters) to travel from closest solar array 32 to inverter 38 and it would be wasteful to use a lead assembly with unused drop lines. The other end of feeder cable 14 terminates in joint 17 having end piece 26, which is typically installed at the solar array located furthest from the inverter. In alternative embodiments, feeder cable 14 includes feeder cable connector 15 at both terminal ends so feeder cables 14 can be connected one-to-another in an end-to-end orientation. In yet another embodiment, one or both ends of feeder cables 14 are blunt cut for subsequent manual connection, for example stripping and crimping to connectors or other segments of feeder cable.

Feeder cable 14 is preferably constructed of 6 gauge to 1000 MCM wire, with the specific wire chosen based on factors such as the number of associated drop lines and the distance between the connection and downstream inverter and whether or not feeder cable 14 is of aluminum or copper construction. Feeder cable connectors 15 are preferably off-the-shelf connectors such as KBT10BV & KST10BV from Multi-Contact of Windsor, CA.

Figure 37:
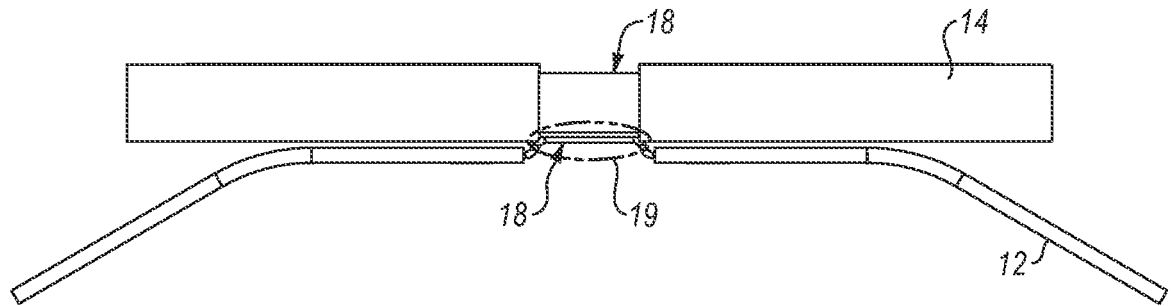
FIG. 37 depicts a dual drop lead assembly for 750 MCM cable with wires exposed at nexus.
Figure 38:
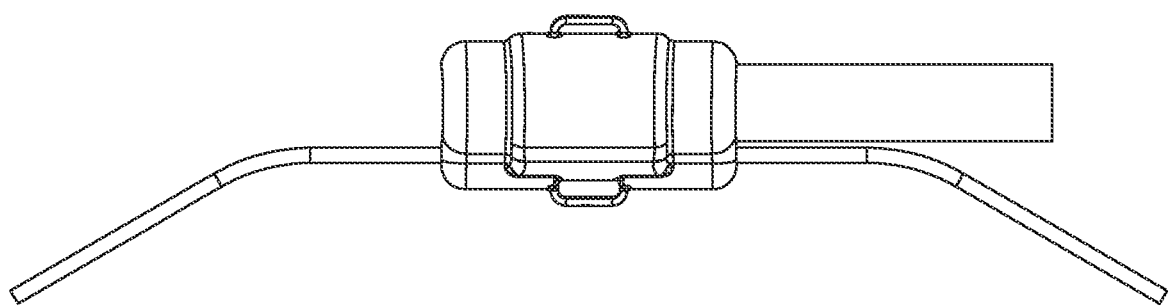
FIG. 38 depicts the end piece for a dual drop lead assembly for 750 MCM cable.
Figure 39:
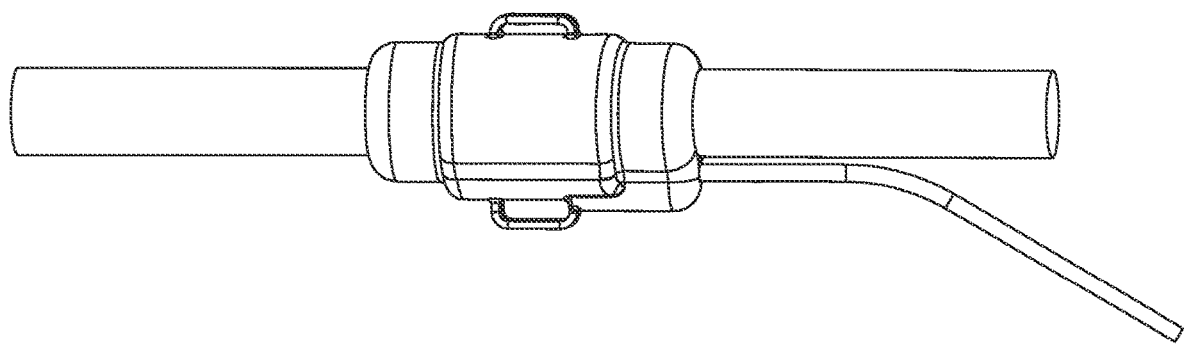
FIG. 39 depicts a single drop lead assembly for 750 MCM cable with overmold shown.
Figure 40:
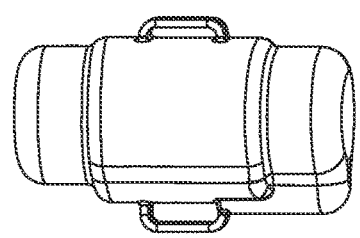
FIG. 40 depicts the overmold for a dual single lead assembly for 750 MCM cable.
Figure 41:
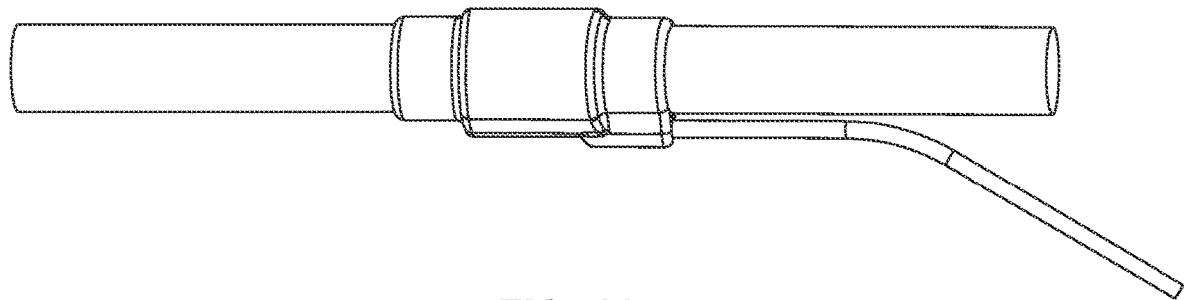
FIG. 41 depicts a single drop lead assembly for 750 MCM cable with undermold shown.
Figure 42:
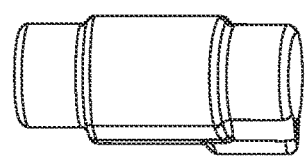
FIG. 42 depicts the undermold for a single drop lead assembly for 750 MCM cable.
Figure 43:
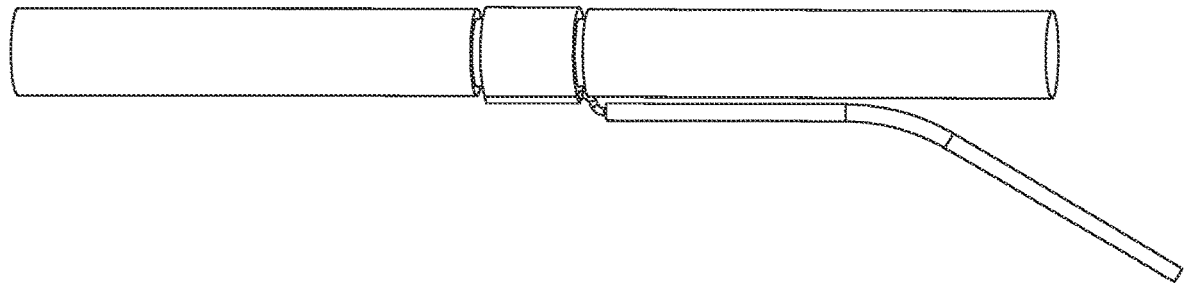
FIG. 43 depicts a single drop lead assembly for 750 MCM cable with compression lug shown.
Figure 44:
FIG. 44 depicts the compression lug for a single drop lead assembly for 750 MCM cable.
Figure 45:
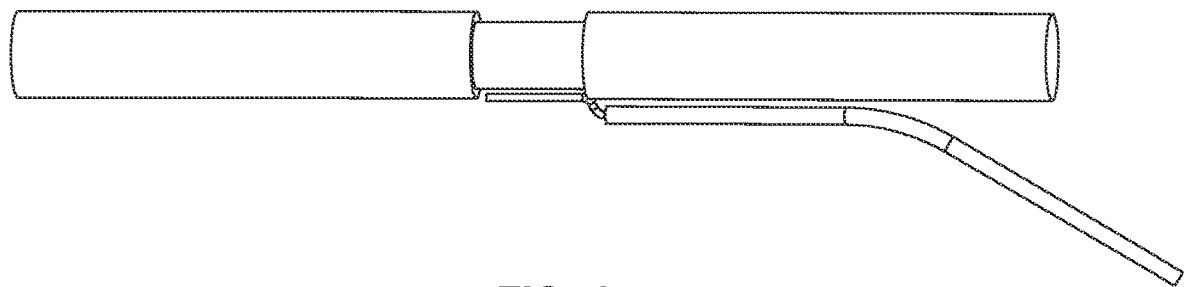
FIG. 45 depicts a single drop lead assembly for 750 MCM cable with wires exposed at nexus.
Figure 46:
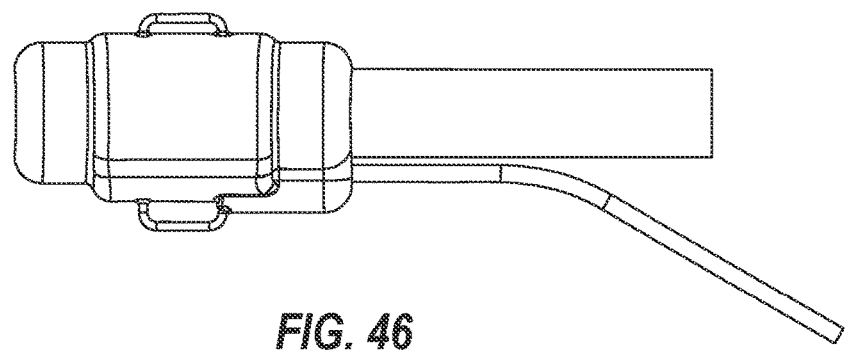
FIG. 46 depicts the end piece for a single drop lead assembly for 750 MCM cable.
Figure 47:
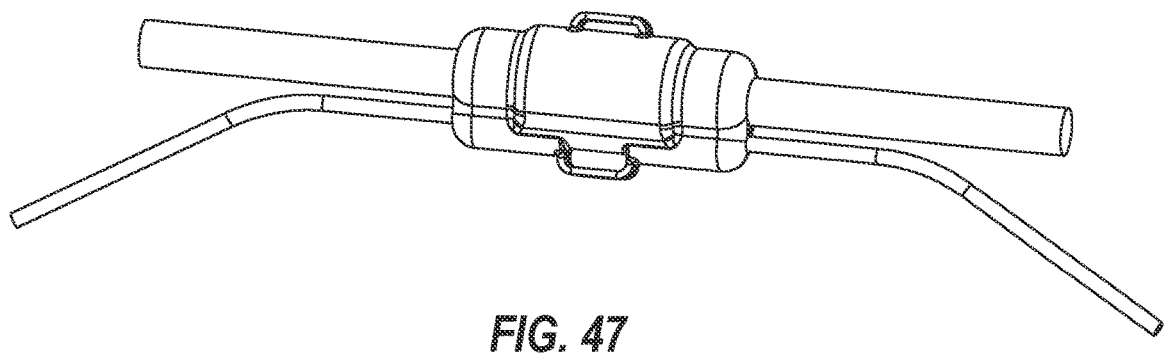
FIG. 47 depicts a dual drop lead assembly for 250 MCM cable.
Figure 48:
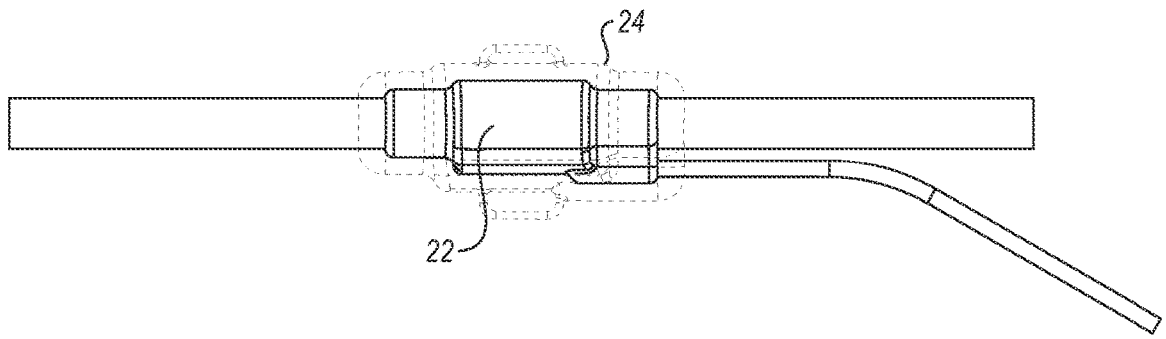
FIG. 48 depicts a single drop lead assembly for 250 MCM cable with the overmold depicted in phantom.
Figure 49:
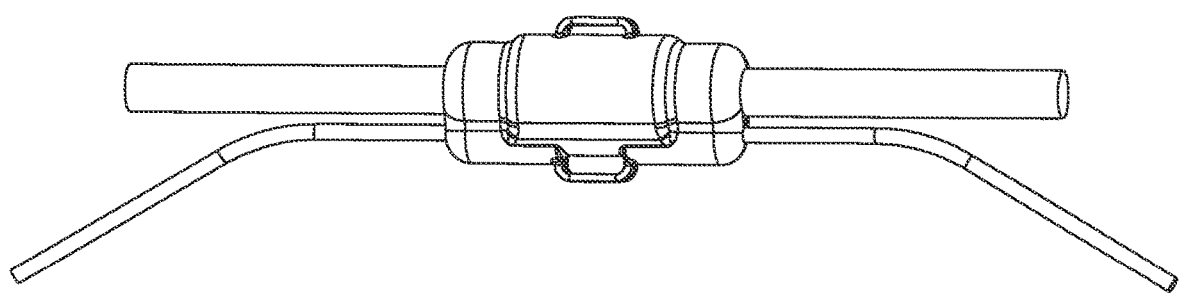
FIG. 49 depicts a dual drop lead assembly for 250 MCM cable with overmold shown.
Figure 50:
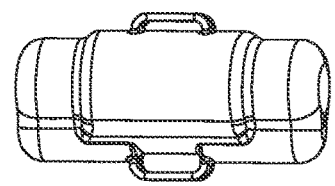
FIG. 50 depicts the overmold for a dual drop lead assembly for 250 MCM cable.
Figure 51:
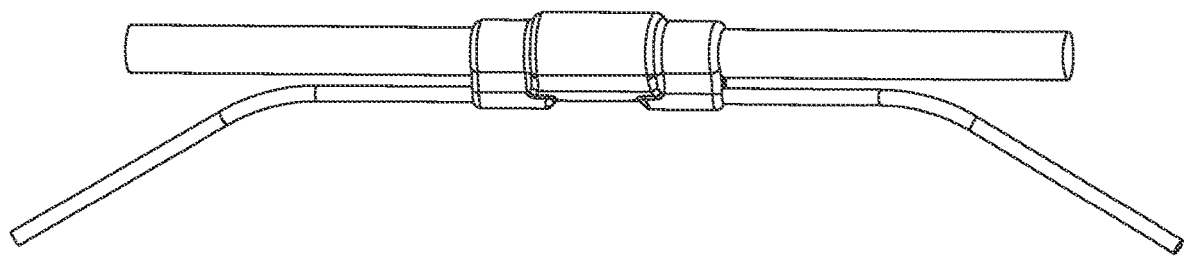
FIG. 51 depicts a dual drop lead assembly for 250 MCM cable with undermold shown.
Figure 52:
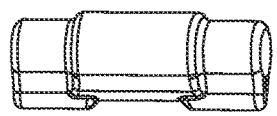
FIG. 52 depicts the undermold for a dual drop lead assembly for 250 MCM cable.
Figure 53:
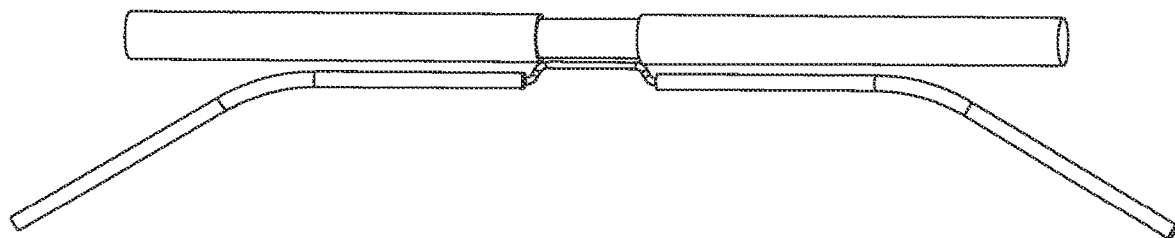
FIG. 53 depicts a dual drop lead assembly for 250 MCM cable with wires exposed at nexus.
Figure 54:
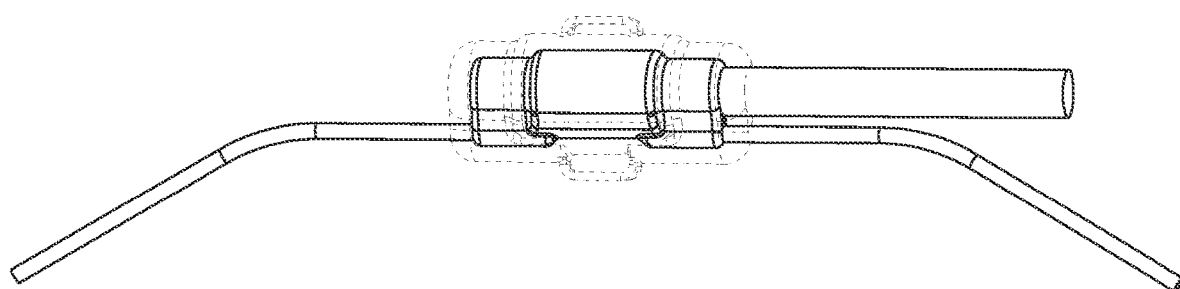
FIG. 54 depicts the end of string for a dual drop lead assembly for 250 MCM cable with the overmold depicted in phantom.
Figure 55:
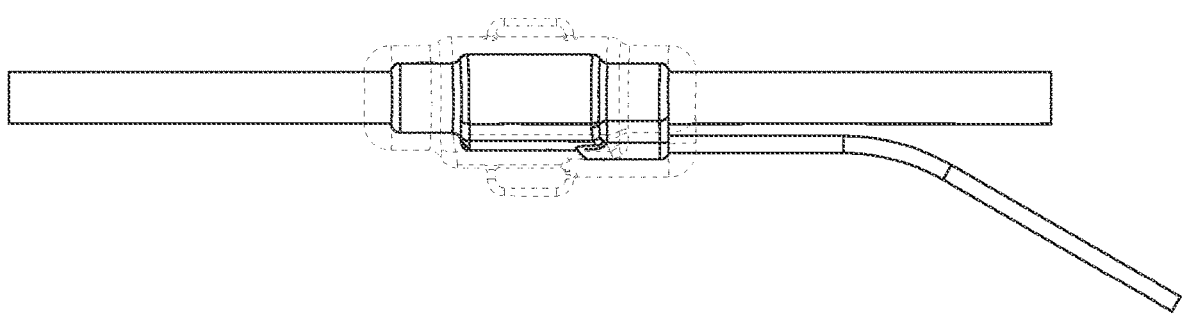
FIG. 55 depicts a single drop lead assembly for 250 MCM cable with the overmold depicted in phantom.
Figure 56:
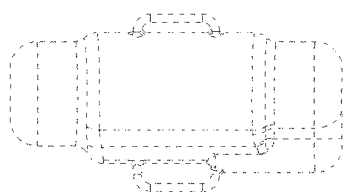
FIG. 56 depicts the overmold for a single drop lead assembly for 250 MCM cable.
Figure 57:
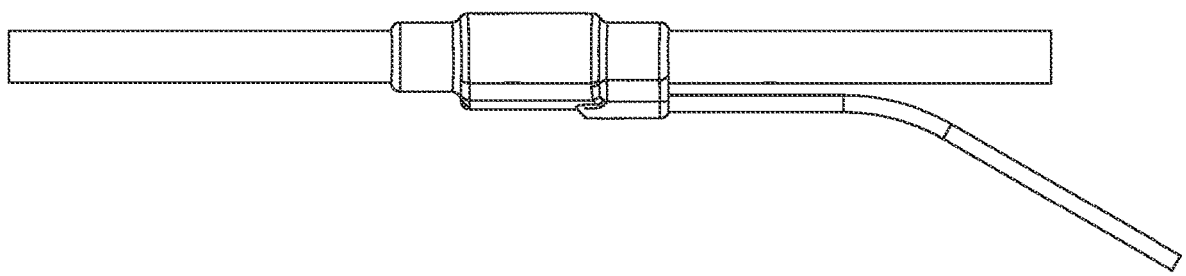
FIG. 57 depicts a single drop lead assembly for 250 MCM cable with undermold shown.
Figure 58:
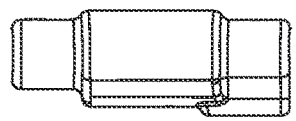
FIG. 58 depicts the undermold for a single drop lead assembly for 250 MCM cable.
Figure 59:
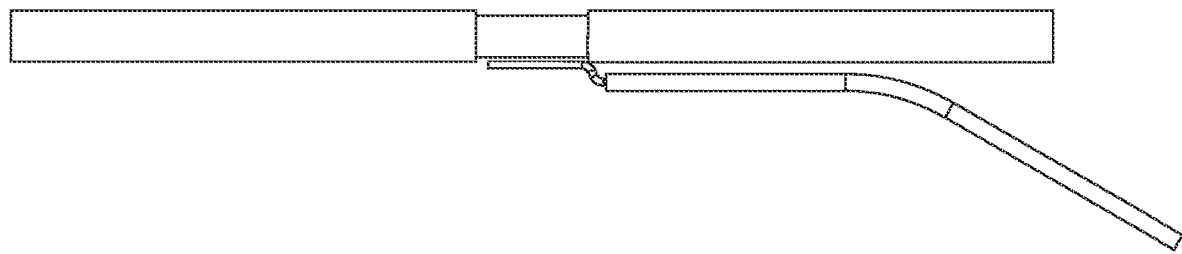
FIG. 59 depicts a single drop lead assembly for 250 MCM cable with wires exposed at nexus.
Figure 60:
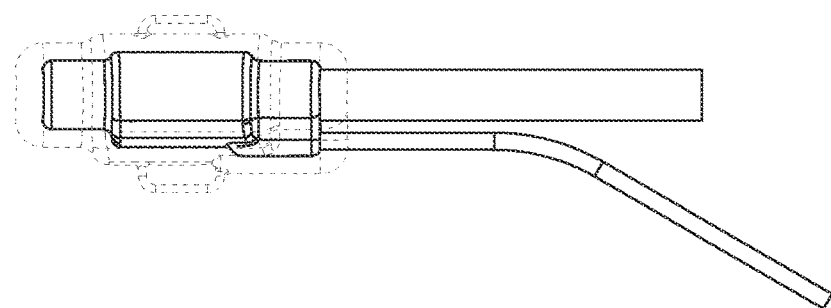
FIG. 60 depicts the end of string for a single drop lead assembly for 250 MCM cable with the overmold depicted in phantom.
Figure 61:
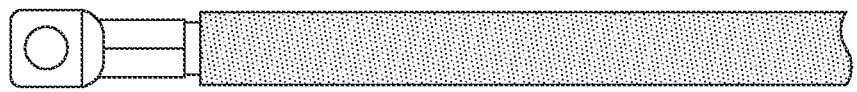
FIG. 61 depicts a compression lug.

Referring to FIG. 37, drop line 12 and feeder cable 14 electrically couple at nexus 19 of joint 17. This is preferably accomplished by stripping wire insulation 16 from corresponding segments of drop line 12 and feeder cable 14, adjoining respective segments of exposed wire 18, and securing contact between the segments of exposed wire by employing compression lug 20. It should be understood that securing contact between the segments could be achieved by other means including soldering, splicing, crimping, and so forth. Compression lug 20 is preferably surrounded by undermold 22, which is preferably composed of RTP 2099Ex127663 from RTP Co. of Winona, MN that has been applied by injection molding. As shown in FIG. 48, undermold 22 is preferably surrounded by overmold 24, which is preferably composed of RTP 199x124807 from RTP Co of Winona, MN that has been applied by injection molding. The resulting assembly is profoundly durable, resistant to environmental factors such as temperature fluctuations, debris, and moisture, and is strong enough to be buried.

In an alternative embodiment, there is no undermold, just an overmold, which is applied in a single molding process.

It is a very important feature that a system of the present invention doesn't require a combiner box. Rather, lead assemblies 10 effectively "combine" the power from solar arrays 32 and deliver it to inverter 38. As shown in FIG. 3, the present invention also eliminates the need of DC feeders, which would carry power from the combiner box to the inverter in a conventional system. Also, the need for fuses can be eliminated by using drop lines including in line fuses 29, as shown in the lower assembly of FIG. 27. Appropriate fuses include of HP 10× from Mersen of Newburyport, MA.

An embodiment of the present invention preferably has the following specifications: Voltage rating of 600 VDC/ 1000 VDC/1500 VDC; Maximum branch current of 30 amps per string; Maximum overcurrent protection of 30 amps per string; maximum trunk cable size of 750 MCM; and Maximum ambient operating temperature of 50° C., although other embodiments beyond these specifications are within the scope of the inventions.

It should also be understood that the illustrations are for the purpose of describing a preferred embodiment of the inventions and are not intended to limit the inventions thereto. By way of example, the present invention can be scaled up or down to accommodate any feeder cable size, including the common 250 and 750 MCM cable sizes. Also, while the current invention has been described in association with DC applications, it should be understood that it could also be implemented into feeders deployed in AC systems, which would negate the need for AC recombiner boxes. It should also be understood that approximations allow variances of +/−10%, unless otherwise noted or nonsensical such as a length less than zero. It should also be understood that all ranges set forth inherently include the endpoints themselves, as well as all increments, there between.

What is claimed is:

1. A lead assembly for electrically coupling one or more drop lines to a feeder cable, the lead assembly comprising:
    a joint where a section of the feeder cable and a section of the one or more drop lines can be electrically coupled at a nexus, the joint including the section of the feeder cable and the section of the one or more drop lines; and
    a monolithic mold that encapsulates the nexus, the monolithic mold further comprising:
        a feeder pathway extending completely through the monolithic mold and configured to allow the feeder cable to extend completely through the monolithic mold; and
        one or more drop line pathways that each extend at least partially through the monolithic mold, and each configured to allow one of the one or more drop lines to extend at least partially through the monolithic mold;

wherein:
each of the one or more drop lines are configured to be capable of receiving electrical power from a plurality of solar panels for combination at the nexus to the feeder cable;
one of the one or more drop lines includes a section of exposed wire at the nexus;
the feeder cable includes a section of exposed wire at the nexus; and
at least a portion of the section of exposed wire of the drop line is parallel to at least a portion of the section of exposed wire of the feeder cable; wherein the one or more drop line pathways and the feeder pathway extend parallel to one another within the nexus, and the monolithic mold has distinct openings at ends of the feeder pathway and one or more drop line pathways through which the one or more drop lines and the feeder cable exit the monolithic mold.

2. The lead assembly of claim 1, wherein the nexus includes at least one of a compression lug, a solder portion, a splice, and a crimp.

3. The lead assembly of claim 1, wherein the feeder cable is configured to attach directly to an inverter.

4. The lead assembly of claim 1, wherein the feeder pathway is formed along a first longitudinal axis and the one or more drop line pathways are each formed along a longitudinal axis different from the first longitudinal axis.

5. The lead assembly of claim 1, wherein the feeder pathway has a first diameter, and the one or more drop line pathways have a second diameter, wherein the second diameter is smaller than the first diameter.

6. The lead assembly of claim 1, comprising two or more drop line pathways.

7. The lead assembly of claim 1, wherein each of the one or more drop lines is configured to terminate at a drop line connector.

8. The lead assembly of claim 7, wherein each of the one or more drop line connectors is configured to connect to a wire harness that is configured to connect to a plurality of solar panels.

9. The lead assembly of claim 1, wherein the combined electrical power received from the plurality of solar panels is conducted directly to an inverter electrically connected to the feeder cable.

10. The lead assembly of claim 1, wherein the lead assembly is configured to combine electrical power received from the plurality of solar panels at the nexus and to deliver the combined electrical power to an inverter that is in electrical communication with the feeder cable.

11. The lead assembly of claim 1, wherein the one or more drop lines each includes a wire of between four (4) to eighteen (18) gauge.

12. The lead assembly of claim 1, wherein the feeder cable includes a wire of between 250 MCM to 1000 MCM.

13. The lead assembly of claim 1, wherein the monolithic mold is injection molded.

14. The lead assembly of claim 1, wherein:
the monolithic mold comprises an undermold;
the lead assembly further comprises an overmold that encapsulates the undermold;
the overmold is injection molded.

15. A lead assembly comprising:
a joint where a section of a feeder cable and a section of each of two drop lines can be electrically coupled at a nexus, each of the two drop lines connected to a wire harness and configured to receive power from a plurality of solar panels;
a primary mold that encapsulates the nexus so as to substantially seal the nexus from external environmental conditions, the primary mold further comprising:
a feeder pathway configured to allow the feeder cable to extend completely through the primary mold; and
two drop line pathways that are each configured to allow the two drop lines to extend at least partially through the primary mold, the two drop line pathways including a first drop line pathway and a second drop line pathway;
wherein at least a portion of the first drop line pathway is parallel to at least a portion of the feeder pathway; and
wherein at least a portion of the first drop line pathway and at least a portion of the second drop line pathway extend in opposite directions along a longitudinal axis that is parallel to a longitudinal axis of the feeder pathway.

16. The lead assembly of claim 15, wherein the feeder cable is directly electrically connected to a component selected from the group consisting of a trunk buss jumper, an inverter, a connection unit, a recombiner, and a disconnect unit.

17. The lead assembly of claim 15, further comprising a secondary mold encapsulating the primary mold and forming an undermold-overmold interface at an outer surface of the primary mold.

18. The lead assembly of claim 15, wherein electrical power received from the plurality of solar panels is combined at the nexus and conducted directly to an inverter electrically connected to the feeder cable.

19. The lead assembly of claim 15, wherein the lead assembly has a voltage rating of at least 1000 VDC.

20. A lead assembly comprising:
a feeder cable;
a drop line cable that includes a first drop line and a second drop line, each of the first drop line and the second drop line having an end connected to a wire harness and configured to receive power from a plurality of solar panels;
a joint where a section of the feeder cable and a section of the drop line cable can be electrically coupled at a nexus to electrically couple each of the first drop line and the second drop line to the feeder cable at the nexus;
a mold structure that encapsulates the nexus so as to substantially seal the nexus from external environmental conditions, the mold structure comprising:
a feeder pathway configured to allow the feeder cable to extend completely through the mold structure; and
a drop line cable pathway configured to allow the drop line cable to extend completely through the mold structure, the drop line cable pathway including a first drop line pathway configured to allow the first drop line to extend partially through the mold structure and a second drop line pathway configured to allow the second drop line to extend partially through the mold structure;
wherein at least a portion of the drop line cable pathway is parallel to at least a portion of the feeder pathway; and wherein at least a portion of the first drop line pathway and at least a portion of the second drop line pathway extend in opposite directions along a longitudinal axis that is parallel to a longitudinal axis of the feeder pathway.

21. The lead assembly of claim 20, wherein the first drop line extends out of and away from the mold structure in one direction and the second drop line extends out of and away from the mold structure in an opposite direction.

22. The lead assembly of claim 20, wherein:
the drop line cable includes a section of exposed wire at the nexus;
a first portion of the section of exposed wire of the drop line cable is a part of the first drop line;
a second portion of the section of exposed wire of the drop line cable is a part of the second drop line;
the feeder cable includes a section of exposed wire at the nexus; and
the section of exposed wire of the drop line cable is electrically coupled to the section of exposed wire of the feeder cable to electrically couple the first drop line and the second drop line to the feeder cable.

23. The lead assembly of claim 22, wherein at least a portion of the section of exposed wire of the drop line cable is parallel to at least a portion of the section of exposed wire of the feeder cable.

24. The lead assembly of claim 20, wherein the mold structure further comprises a monolithic mold structure.

\* \* \* \* \*